(12) United States Patent
Awad

(10) Patent No.: US 8,036,285 B2
(45) Date of Patent: Oct. 11, 2011

(54) MULTI-CARRIER COMMUNICATION SYSTEM

(75) Inventor: Yassin Aden Awad, London (GB)

(73) Assignee: Fujitsu Limited, Kawasaki (JP)

( * ) Notice: Subject to any disclaimer, the term of this patent is extended or adjusted under 35 U.S.C. 154(b) by 1065 days.

(21) Appl. No.: 11/546,982

(22) Filed: Oct. 13, 2006

(65) Prior Publication Data

US 2007/0189334 A1    Aug. 16, 2007

(30) Foreign Application Priority Data

Oct. 25, 2005    (EP) .................................... 05256598

(51) Int. Cl.
*H04K 1/10* (2006.01)
(52) U.S. Cl. ........ 375/260; 375/259; 375/219; 375/347; 375/340; 370/203; 370/208; 370/210; 370/335; 370/342; 370/380
(58) Field of Classification Search .................. 375/260, 375/259, 219, 296, 347, 340; 370/203, 208, 370/210, 335, 342, 380
See application file for complete search history.

(56) References Cited

U.S. PATENT DOCUMENTS

| | | | | |
|---|---|---|---|---|
| 2002/0018483 | A1* | 2/2002 | Kuwabara et al. | 370/430 |
| 2004/0146003 | A1* | 7/2004 | Schaefer et al. | 370/206 |
| 2004/0156309 | A1* | 8/2004 | Chadha et al. | 370/208 |
| 2006/0088112 | A1* | 4/2006 | Das et al. | 375/260 |
| 2006/0274868 | A1* | 12/2006 | Chen et al. | 375/347 |

FOREIGN PATENT DOCUMENTS

JP    2004147126 A    5/2004

OTHER PUBLICATIONS

Search report issued on priority European application No. 05256598. 3.
UK Patent Application GB 2 409 135 A, (Samsung Electronics Co. Ltd) dated of publication 16.15.2005, Application No. 0328895.8, date of Filing Dec. 12, 2003.
Ning Chen and G. Tony Zhou; "Peak-To-Average Power Ratio Reduction in OFDM with Blind Selected Pilot Tone Modulation", Acoustics, Speech, and Signal Processing, 2005. IEEE International Conference on Philadelphia, Pennsylvania, USA Mar. 18-23, pp. 845-848; XP-010793954.
A.D.S. Jayalath and C. Tellambura; "A blind SLM receiver for PAR-reduced OFDM", IEEE Vehicular Technology Conferences, pp. 219-222, Vancouver, Canada, Sep. 24 to 28, 2002.

(Continued)

*Primary Examiner* — Dac Ha
*Assistant Examiner* — Zewdu Kassa
(74) *Attorney, Agent, or Firm* — Murphy & King, P.C.

(57) ABSTRACT

The present application relates to a communication method in which a succession of time domain symbols (TDS) are transmitted by a transmitter to one or more receivers. Each time domain symbol has a plurality of signals which are transmitted in parallel by the transmitter. The signals may comprise data signals or pilot signals. At the transmitter, a set of pilot signals assigned to a given time domain symbol is provided with information about a phase vector applied to the time domain symbol. The phase vector is preferably selected with consideration of the reduction in the ratio of peak-to-average-power which can be achieved when the vector is applied to the time domain symbol. Transmitters and receivers for use in the communication method are also provided. The invention is particularly application to OFDM communication systems.

34 Claims, 17 Drawing Sheets

OTHER PUBLICATIONS

A.D.S. Jayalath and C. Tellambura; SLM and PTS Peak-Power Reduction of OFDM Signals Without Side Information, 2000.

S.H. Müller and J.B. Huber, *OFDM with reduced peak-to-average power ratio by optimum combination of partial transmit sequences*, pp. 368-369, @IEE 1997.

R.W. Bäuml, R.F.H. Fischer and J.B. Huber, *Reducing the peak-to-average power ratio of multicarrier modulation by selected mapping*, pp. 2056-2057, @IEE 1996.

Office Action dated May 10, 2011 in corresponding Japanese application No. 2006-290328.

Takeo Fujii, et al., "Weighting Factor Estimation Methods for Partial Transmit Sequences OFDM to Reduce Peak Powere", IEICE transactions on communications, The Institute of Electronics, Information and Communication Engineers, Jan. 1, 2002, pp. 221-230.

Katsumi Yamashita, et al. "Peak Power Reduction for OFDM Signal and Phase Rotation Transition by Pilot Signal", Technical Report of IEICE, The Institute of Electronics, Information and Communication Engineers, Jan. 17, 2003, pp. 15-19, CAS2002-127 (translation/Cited Document 2 (Chapter 3.2).

* cited by examiner

MULTI-CARRIER COMMUNICATION SYSTEM

BACKGROUND OF THE INVENTION

1. Field of the Invention

The present invention relates to multi-carrier communication systems, such as frequency division multiplexing (FDM) systems and orthogonal division multiplexing (OFDM) systems, transmitters, receivers and to methods of transmitting a signal in such systems.

2. Description of the Related Art

In a multi-carrier transmission system, such as FDM or OFDM, a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to impulse noise and reflections. A disadvantage of FDM systems is that a guard band frequency is required between each modulated sub-carrier to ensure that the spectrum of one sub-carrier does not interfere with the spectrum of another. The necessity for guard bands in an FDM system significantly lowers the spectral efficiency of the system.

Orthogonal frequency division multiplexing (OFDM) is a modulation technique that is based on FDM. An OFDM system uses a plurality of sub-carrier frequencies which are perpendicular in a mathematical sense so that the sub-carriers' spectra may overlap without interference. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections and in some wireless LAN applications, including WiMAX and IEEE 802.11 a/g. OFDM is often used in conjunction with channel coding, an error correction technique, to create coded orthogonal FDM or COFDM. COFDM is now widely used in digital telecommunications systems to make it easier to encode and decode such signals. The system has found use in broadcasting as well as certain types of computer networking technology.

FIG. 1 shows an example of a signal transmitted in a multi-carrier system such as OFDM. The signal comprises a sequence of time domain symbols (TDS) or symbol "blocks", each time domain symbol comprising a set of N signals, the signals comprising pilot signals or data signals and being transmitted in parallel (i.e. at the same time) each by a different sub-carrier frequency. A sequence of time domain symbols forms an information unit F of the system. The information unit shown in FIG. 1 comprises 38 time domain symbols of which 32 TDS's are data symbol blocks (DSB) and 6 TDS's are pilot signal blocks (PSB).

In an OFDM system, a block of N modulated data source signals are mapped to N orthogonal sub-carriers by using an Inverse Fourier Transform algorithm (IDFT/IFFT) to form a block of N parallel signals, known as an "OFDM symbol", in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \; 0 \le t \le T_s \quad (1)$$

where $\Delta f$ is the sub-carrier separation, $T_s = 1/\Delta f$ is symbol time interval, and $c_n$ are the modulated source signals. The sub-carrier vector in (1) onto which each of the source signals is modulated $c \in Cn$, $c = (c_0, c_1, \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

As can be seen from equation (1), an OFDM time domain symbol consists of the composite of a number N of independent modulated signals which are transmitted simultaneously, in the time internal $T_s$, by the transmitter of an OFDM system to one or more receivers. There is therefore the potential for all N signals to be in phase and, consequently, for the peak value of the composite OFDM waveform to be the sum of the peaks values of all sub-carrier signals. When these N signals are added up with the same phase, they produce a maximum peak power that is N times the average power. The peak-to-average-power-ratio (PAPR) is defined as follows:

$$PAPR = \frac{\max_{0 \le n < N} |x(n)|^2}{E[|x(n)|^2]} \quad (2)$$

Where E denotes expectation/average value. The theoretical maximum of the PAPR for N number of sub-carriers is 10 log(N) dB.

The high PAPR inherent in OFDM systems causes problems when the signal has to be subject to power amplifiers. Specifically, the high PAPR values can drive the amplifier into a saturation region, where an increase in input drive level does not result in an increase in output level. This non-linearity reduces the efficiency of the amplifier.

A number of approaches have been proposed to reduce the PAPR of multi-carrier multiplexed signals, in particular of OFDM signals, including: amplitude clipping, tone reservations (TR), and interleaving. However, these previously proposed techniques have been found to introduce various other problems which negate the improvement seen in the PAPR such as an increase in the required transmit signal power, a reduction in the data rate of the system and an increase in bit error and complexity of the system. Two other previously considered techniques which have proved to be highly effective at reducing PAPR are selected mapping (SLM) and the use of partial transmit sequences (PTS). Both of these techniques involve adjustment of the phase of the sub-carrier signals comprised in a time domain symbol in order to optimise the composite OFDM waveform that is eventually transmitted. Selected mapping (SLM), is described in detail in R. W. Bauml, R. F. H. Fischer and J. B. Huber, "Reducing the Peak to Average Power Ratio of Multicarrier Modulation by Selected Mapping", Electronics Letters, Vol. 32, No. 22, October 1996. The use of Partial Transmit Sequences in described in S.H.Muller and J.B. Huber, "OFDM with reduced Peak-to-Average Power Ratio by Optimum Combination of Partial Transmit Sequences," Elect. Lett., vol. 33, no.5, February 1997, pp.368-69.

According to the SLM technique, a sequence of data source symbols which will comprise a time domain symbol, $C_n$ $\{C_n = c_0, c_1, c_2, \ldots c_{n-1}\}$ is subjected to U different phase vectors $Q_u$, to create a set of different, but equivalent (in term of data content), signal representations of the time domain symbol. Key parts of a basic SLM transmitter 18 are shown in FIG. 2. Each vector $Q_u$ consists of a sequence of N phase elements $\phi_0$, $\phi_1$, $\phi_2$, ..., $\phi_{N-1}$, and, according to the SLM procedure, each element is applied to a different sub-carrier of the time domain symbol so that the phase of each signal is adjusted by a single phase element of the vector. The vector $Q_u$, may be represented mathematically by:

$Q_u=[e^{j\phi_0^u}, e^{j\phi_1^u}, \ldots e^{j\phi_{N-1}^u}]$, where $u \in \{0,1,\ldots, U-1\}, \Phi_n^u \in (0, 2\pi)$ for all U vectors.

A set of U phase vectors is preferably stored in a phase vector storage unit of the SLM block 18, wherein the sequence of phase vector elements comprised in a particular phase vector Qu is preferably be generated randomly. Thus, the SLM technique effectively randomises the phase of each sub-carrier so that when the sub-carriers are added together, the signals are less likely to be in phase with one another and the resultant envelope OFDM is flatter. The transmitter then selects the vector which results in the OFDM symbol having the lowest PAPR for transmission.

According to the SLM technique, the original OFDM data symbol can be recovered from the received signal $r_n$ by multiplying the conjugate of applied vector, $Q_u^*$, to the received signal. To do this, knowledge of the applied vector sequence is needed at the receiver. The present invention is concerned with this technical problem.

There are two main ways in which the identity of the applied vector may be ascertained by the receiver. The first involves sending information about the applied phase sequences to the receiver as side information, so that the receiver is subsequently able to recover the original data symbol from a calculation of $r_n Q_u^*$. The side information is commonly in the form of index number which uniquely identifies each of the phase vectors $Q_u$. However, this approach utilises bandwidth and increases signalling overhead. Whilst in practice a large number of U vectors leads to a better PAPR reduction, any improvement in PAPR must be weighed against the logarithmic increase in the signalling overhead that is required as the number of U increases. For example, if U=16, then $\log_{2(U)}=4=$ the number of bits required per OFDM time domain symbol as side information. In this case, if an information unit, or frame, of the system consists of 32 OFDM symbols, then 32*4=128 bits are needed to be sent to the receiver in every information unit. FIG. 3 shows the possible PAPR reduction that may be achieved with SLM using 4, 8, 16 and 64 vectors in an OFDM system comprising 512 sub-carriers applied on QPSK modulation without coding.

Another technique has recently been proposed in a paper entitled "A blind SLM receiver for PAR-reduced OFDM", by A.D.S. Jayalath and C Tellambura, Proceedings of IEEE Vehicular Technology Conference, pp 219-222, Vancouver, Canada, 24 to 28 Sep. 2002. The proposed technique employs a decoder in the receiver which performs a set of calculations for each received OFDM data symbol. According to this technique, the value, or index number, representing the optimal phase vector which is applied to the OFDM data symbol is not transmitted to the receiver. Rather, the decoder, which has prior knowledge of all possible vectors $Q_u$, performs a set of trial calculations to find the minimum distance between $r_n Q_u^*$ (where $Q_u^*$ is the conjugate of one of the phase vector elements) and $\hat{H}_n c_n$, where $\hat{H}_n$ is an estimate of the channel impulse response and $C_n$ is one of the constellation points of the used modulation scheme which is known at the receiver. The received signal $r_n$, after the DFT demodulation at the receiver is given by:

$$r_n = H_n P_n e^{j\phi_n^u} + n_n \quad (3)$$

Assuming a distortion less and noiseless channel, we can assume that the receiver gets a received signal vector $r=c \oplus Q_u$. Conceptually, for each received signal $r_n$ (n=0, ..., N-1) the decoder computes the difference between each of a set of "trial" received signal and a representation of the actual received signal. If the trial received signal is correct, the difference will be zero, however in reality, the correct phase vector can be identified as the trial vector which results in the minimum difference. The decoder therefore computes the following decision metric for each time domain symbol received from the transmitter.

$$D = \min_{Q_u} \sum_{n=0}^{N-1} \min_{c_n \in Mod} |r_n e^{-j\phi_n^1} - \hat{H}_n c_n|^2 \quad (4)$$

A block diagram of such a receiver is shown in FIG. 4. The proposed scheme works on the assumption that (1) $c_n$'s are restricted to the constellation points of a particular modulation scheme, for example, QPSK; (2) the set of applied vectors is fixed and known at the receiver and (3) $c \oplus Q_u$ and $c \oplus Q_v$ are sufficiently different for $u \ne v$. In other words, the set of available phase vectors have large Hamming distances, providing inherent diversity which can be exploited at the receiver.

The proposed blind receiver is advantageous in that the need to send side information is averted. However, the improvements seen in the throughput of the system are countered by a significant increase in receiver complexity. The signal processing required by the receiver is substantial and amounts to $U*N*N_{data}*M$ operations per information unit, where M refers to the number of constellation points for a particular modulation scheme, (e.g. QPSK) U is the number of possible vectors, N is the number of sub-carriers and $N_{data}$ is the number of OFDM time domain symbols. Another disadvantage of the known blind receiver is that for each OFDM symbol, the same modulation scheme should be used on each sub-carrier so that a mixed modulation scheme employing, for example, QPSK on some sub-carriers and 16QAM on other sub carriers, is not permitted. Furthermore, the receiver requires an accurate estimation of the channel where a high level modulation scheme is employed (16/64 QAM) which may mean that more pilot overhead is required.

SUMMARY OF THE INVENTION

Embodiments of the present invention seek to alleviate the problems associated with the known techniques, and to provide a technique for enabling a receiver to have knowledge about a phase vector applied to a time domain symbol without unduly increasing the complexity of a receiver and the signal processing burden required to "decode" the received signal.

According to embodiments of the present invention, pilot signals are utilised to carry information about a phase vector applied to a time domain symbol of a multi-carrier signal from a transmitting side to a receiving side. The phase information required to extract the data from an information unit of a multi-carrier signal is therefore embedded or encoded into the pilot signals within the information unit.

It is well known that the presence "pilot" signals, i.e. signals of known amplitude and phase in a multi-carrier signal enables the receiver to obtain an estimate of the channel impulse response when signals are sent from the transmitter to a receiver. This is needed to obtain a coherent demodulation of the other sub-carriers that carry data symbols. According to known techniques, a constant pilot symbol may be repeatedly modulated onto one or more designated sub-carrier channels. Alternatively, a plurality of pilot signals may be provided in a single symbol time interval so as to form a "block" of pilot signals. In this case, one or more pilot signal "blocks" (PSB) may be advantageously provided at the beginning of the information unit, so that the receiver may use the pilot signals to obtain a estimation of the channel impulse response ("channel") experienced by the transmitted information unit. It is usual for the pilot signal blocks to be repeated in the middle and at the end of an information unit as shown in FIG. 1. According to embodiments of the present invention, the pilot signals designated for carrying phase information can also be used for obtaining the required channel estimation. As such, the additional data rate loss introduced by the presently proposed technique is minimal. In effect, preferred embodiments of the present invention take advantage of the necessity for pilot information, by using the pilot signals to also convey phase information about a phase vector applied to a time domain symbol between the transmitter and the receiver.

According to the present invention there is provided a communication method in which a succession of time domain symbols are transmitted by a transmitter to one or more receivers, each time domain symbol comprising a plurality of signals which are transmitted in parallel by the transmitter, the signals including data signals or pilot signals, the method comprising:

at the transmitter, providing a set of pilot signals assigned to a given time domain symbol with information about a phase vector applied to the signals comprised in said time domain symbol, the phase vector comprising a sequence of phase elements wherein the phase of each signal of the time domain symbol is adjusted by one said phase element, wherein each of the pilot signals comprised in the set of pilot signals is provided with information about the phase adjustment for one said signal of determinable position within the said time domain symbol.

Embodiments of the present invention advantageously allow a receiver of the transmitted multi-carrier signal to process the pilot signals provided with phase information in order to determine the identity of a phase element applied to a sub-carrier within the time domain symbol. Then, from the position of that sub-carrier within the time domain symbol, which may be known to, or determined by, the receiver it is subsequently possible for the receiver to identify the entire sequence of phase elements constituting the applied phase vector with reference to a set of possible phase vector sequences. This set of possible phase vectors is preferably known to the receiver.

The position of the signal for which a given pilot signal is provided with phase information within the time domain symbol is preferably known by the receiver. It will be understood by those skilled in the art that in any communication system, the transmitter and receiver are preferably pre-programmed with the frame-structure which will be used to transmit signals. Thus, the receiver preferably has prior knowledge of the position of the pilot signals which carry phase information in any given information unit. Furthermore, the correlation between each phase signal carrying phase information and the sub-carrier which has undergone the respective phase adjustment, will preferably also be known for a particular information unit structure. Alternatively, if the structure of the information unit is not known, or changes with respect to a previous transmission, information about the structure, or the change in structure, must be signalled to the receiver. This is usually done by means of a transport format combination unit (TFCI) which represents the current transport format so that the receiving layers can appropriately decode, de-multiplex and deliver the received data.

Preferably, the phase vector applied to a given time domain symbol is selected from a set of possible phase vectors $Q_u$, wherein (u=1, 2, ...U). Preferably, the selection of the phase vector is based on a consideration of the reduction in peak-to-average power ratio which can be achieved by applying the selected vector to the N signals comprised in the time domain symbol. Preferably, the selection of the phase vector is performed using a method of selected mapping (SLM).

The pilot signals assigned to carry the phase information may be positioned and arranged within a given information unit in a number of different ways. According to one embodiment, the set of pilot signals assigned to a given time domain symbol are carried by signals comprised in a different time domain symbol. Preferably, in this case, all of the sets of pilot signals assigned to the time domain symbols selected for phase adjustment in an information unit are arranged to form a time domain symbol of pilot signals, or a "pilot signal block" PSB. An advantage of this arrangement is that the received pilot signal block can be more readily processed at the receiver to extract the phase information (and thus ascertain the phase vectors applied to the time domain symbols), since the correlation between each pilot signal and the appropriate sub-carrier of the respective time domain symbol is more straightforward.

Therefore, the processing of the pilot signals can be performed relatively quickly and, furthermore, an estimate of the channel can advantageously be obtained at the same time and prior to receiving the time domain data symbols.

According to this embodiment, it is envisaged that a phase adjustment means, which is provided, for example, by an SLM unit comprised in the transmitter, will apply the selected phase vector to the time domain symbols selected for phase adjustment in a given information unit. The phase adjusted time domain symbols will then be buffered, or stored, within the transmitter for subsequent transmission. Preferably, the transmitter further comprises a selected phase vector storage unit, for storing the phase vector selected by the phase adjustment unit, as well as an encoding unit. As the phase vectors of the selected time domain symbols become known, or once the phase vectors of all the selected time domain symbols comprised in an information unit of the multi-carrier signal are known, the encoder performs the step of providing each of the pilot signals comprised in each set of pilot signals by the appropriate phase information. This is preferably done by multiplying a given pilot signal by the phase element which has been used to adjust the phase of the appropriate sub-carrier to thereby adjust the phase of the pilot signal.

Alternatively, according to a second embodiment, the set of pilot signals assigned to the time domain symbol are carried by signals comprised in the said time domain symbol. The pilot signals therefore appear to be arranged "within" the time domain symbol for which the pilot signals carry phase vector information. Thus, in a given time domain symbol, a number of the sub-carriers, $N_{pilot}$, are each modulated with known pilot information whilst the remaining sub-carriers, $N-N_{pilot}$, are modulated with data. The pilot information may be modulated onto a set of adjacent sub-carrier frequencies, or they may be scattered within the frequency domain of the time domain symbol. It should be appreciated that the pattern, or arrangement, of the pilot signals within the time domain symbol may vary between consecutive time domain symbols or between consecutive information units. This embodiment is particularly advantageous for a number of reasons. Firstly, the phase vector applied to a given time domain symbol will be applied to the pilot signals carried by sub-carriers comprised in the time domain symbol. Consequently, the sub-carriers onto which each of the pilot signals comprised in the block are modulated will undergo a phase adjustment. The phase element applied to a particular sub-carrier which carries a pilot signal will depend on the position (i.e. frequency) of the pilot signal in the symbol block. Applying a phase vector comprising a sequence of phase elements to a set of pilot signals of known, or determinable, positions within the time domain symbol therefore effectively "encodes" those pilot signals with information about the phase vector applied to the whole time domain symbol Specifically, a phase vector applied to a time domain symbol block can be determined from the spatial correlation that will exist between the positions of the encoded pilot signals in the frequency domain of the time domain symbol, and the position of the phase element within the sequence of phase elements forming the said phase vector. According to this embodiment it is envisaged that the step of providing each of the pilot signals with information about the phase adjustment for one said signal of determinable position within the respective time domain symbol, may be advantageously achieved during the application of the phase vector to the time domain symbol. This will preferably be performed by the phase adjustment unit, such as the SLM unit of the transmitter.

According to a second aspect of the present invention there is provided a communication method in which a succession of time domain symbols are transmitted by a transmitter to one or more receivers, each time domain symbol comprising a plurality of signals which are transmitted in parallel by the transmitter, wherein the signals may comprise data signals or pilot signals, the method comprising:

at the receiver, processing a set of pilot signals assigned to a given time domain symbol to determine information about a phase vector applied to the signals comprised in said given time domain symbol by the transmitter, the phase vector comprising a sequence of phase elements, wherein the phase of each signal of the time domain symbol has been adjusted by one said phase element, wherein each of the pilot signals comprised in said set of pilot signals are processed to obtain information about the phase adjustment made to one said signal of determinable position within the said time domain symbol.

Preferably, the receiver identifies the phase vector applied to the given time domain symbol from consideration of a set of possible phase vectors which may advantageously be stored in a library of phase vectors provided in the receiver. The processing performed by the receiver preferably involves performing a plurality of calculation operations, each calculation operation utilising a phase element taken from a predetermined position in a trial phase vector chosen from a set of possible phase vectors. The position of the element in a trial vector is determined by consideration of i) the position of the signal about which the pilot signal is provided with information within the given time domain symbol and the sequence of phase elements comprised in the trial phase vector.

Preferably, the receiver performs the following calculation in order to process the set of pilot signals:

$$V_{SLM} = \min_{Q_u} \sum_{n=0}^{K-1} |r_n P_n^* - \hat{H}_n e^{j\phi_n^u}|^2 \quad (5)$$

where $r_n$ is the received set of pilot signals, K is the number of pilot signals comprised in each set of pilot signals, $P_n^*$ is the conjugate of the phase symbol, and $\hat{H}_n e^{j\Phi_n^u}$ is an estimate of the channel impulse response multiplied by the phase element taken from the trial phase vector.

Alternatively, the receiver performs the following calculation in order to process the set of pilot signals:

$$V_{SLM} = \min_{Q_u} \sum_{n=0}^{K-1} \text{abs}(\arg(r_n P_n^*) - \arg(\hat{H}_n e^{j\phi_n^u})) \quad (6)$$

where $r_n$ is the received set of pilot signals, K is the number of pilot signals comprised in each set of pilot signals $P_n^*$ is the conjugate of the phase symbol, and $\hat{H}_n e^{j\Phi_n^u}$ is an estimate of the channel impulse response multiplied by the phase element taken from the trial phase vector.

The number of pilot signals, K assigned to each time domain symbol should be sufficient to allow an entire vector sequence to be uniquely identified. Thus, the minimum number of pilot signals comprised in each set $P^n$ of pilot signals will depend on the number U of possible vectors $Q_u$ and the degree of difference between two possible vectors. Each information unit of a multi-carrier signal should preferably be provided with enough sets of pilot signals as to allow the phase vector applied to the original data symbols blocks comprised in the transmitted information unit to be determined. Thus, a set $P^n$ of pilot signals is preferably provided for each time domain symbol comprised in each information unit of a multi-carrier signal so that n=1, 2, . . . $N_{data}$. It should be appreciated that the number of time domain symbols, $N_{data}$, comprised in an information unit may vary and therefore that the number of sets of pilot signals required by an information unit may also vary.

According to a further aspect of the present invention, there is provided a transmitter for transmitting a succession of time domain symbols to one or more receivers, each time domain symbol comprising a plurality of signals which are transmitted in parallel by the transmitter, wherein the signals may comprise data signals or pilot signals, the transmitter comprising:

i) phase adjustment means for applying a phase vector to the signals comprised in a time domain symbol, the phase vector comprising a sequence of phase elements, wherein the phase of each signal of the time domain symbol is adjusted by one said phase element; and ii) phase encoding means for providing a plurality of pilot signals assigned to the said time domain symbol with phase information about the phase adjustment for one said signal of determinable position within said time domain symbol.

According to a still further aspect of the present invention, there is provided a receiver for receiving a succession of time domain symbols from a transmitter, each time domain symbol comprising a plurality of signals which were transmitted in parallel by the transmitter, wherein the signals may comprise data signals or pilot signals, the receiver comprising:

pilot signal processing means for processing a set of pilot signals assigned to a given time domain symbol to determine information about a phase vector applied to the signals comprised in said given time domain symbol by the transmitter, the phase vector comprising a sequence of phase elements, wherein the phase of each signal of the time domain symbol has been adjusted by one said phase element, wherein each of the pilot signals comprised in said set of pilot signals are processed to obtain information about the phase adjustment made to one said signal of determinable position within the said time domain symbol.

Embodiments of the present invention are advantageous in that the necessity to use bandwidth in order to transmit side information to the receiver is substantially averted. Instead, pilot signals required to facilitate an estimate of channel, are also used to carry phase information. Moreover, the receiver need only process a set of pilot signals provided with phase information about the phase vector applied to a particular time domain symbol in order to identify that phase vector. Thus, the processing burden of a receiver embodying the present invention is significantly reduced as compared to the processing that is required by the prior art receiver shown in FIG. 4.

In any of the above aspects, the various features may be implemented in hardware, or as software modules running on one or more processors or as a combination of the two. For example, each transmitter and each receiver mentioned above may have a processor such as a digital signal processor (DSP), or a computer which operates according to a program. The invention also provides computer programs and computer program products for carrying out any of the methods described herein, and computer readable media having stored thereon programs for carrying out any of the methods described herein. A computer program embodying the invention may be stored on a computer-readable medium, or it could, for example, be in the form of a signal such as a downloadable data signal provided from an Internet web site, or it could be in any other form.

It will be understood that either of the transmitter or the receiver mentioned above could be provided in a base-station or (Node-B). Further, either of the transmitter or the receiver could be provided in a user equipment (UE).

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE PREFERRED EMBODIMENTS

Figure 1:
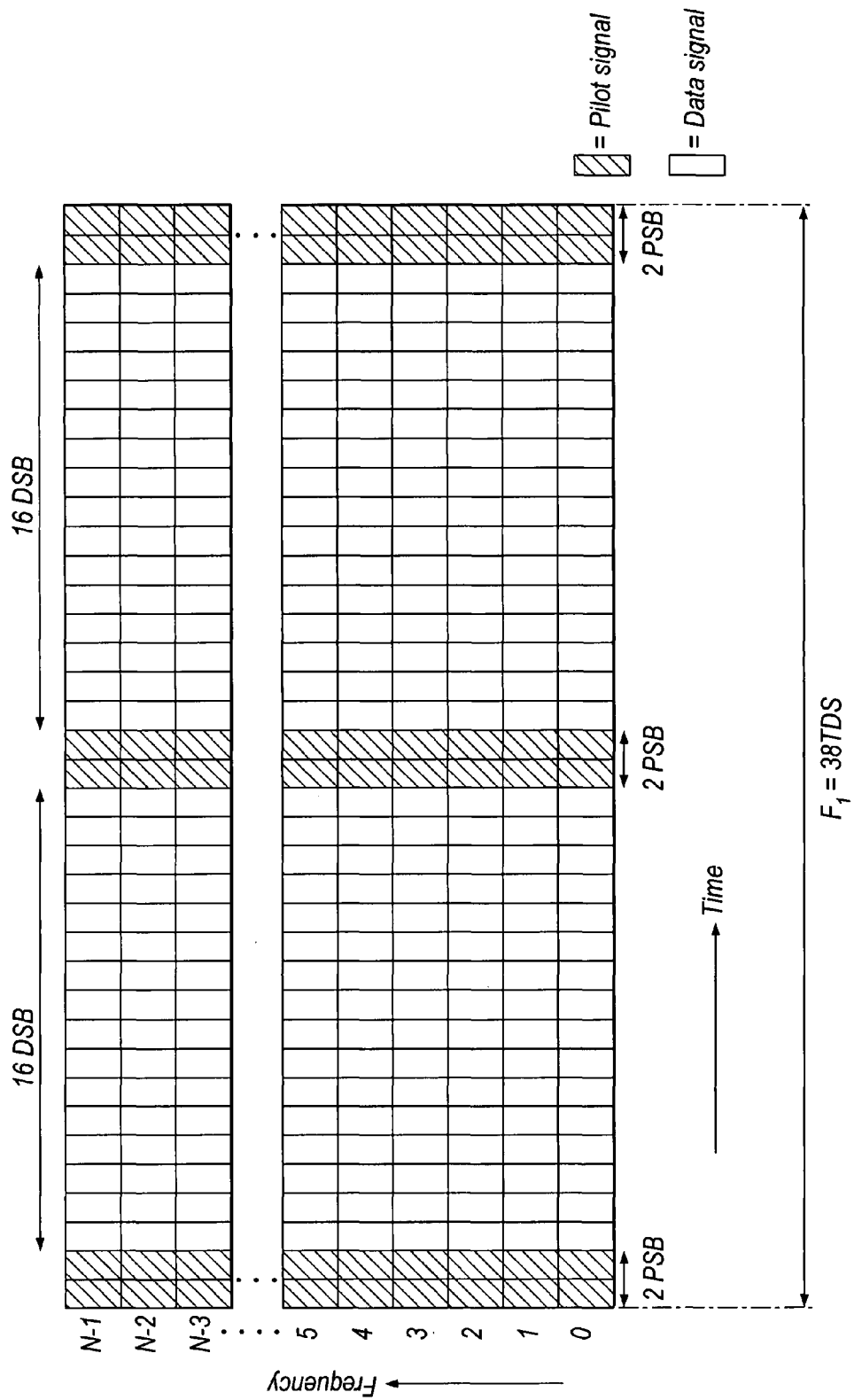
FIG. 1 illustrates an information unit of a signal transmitted in a multi-carrier system such as OFDM.
Figure 5:
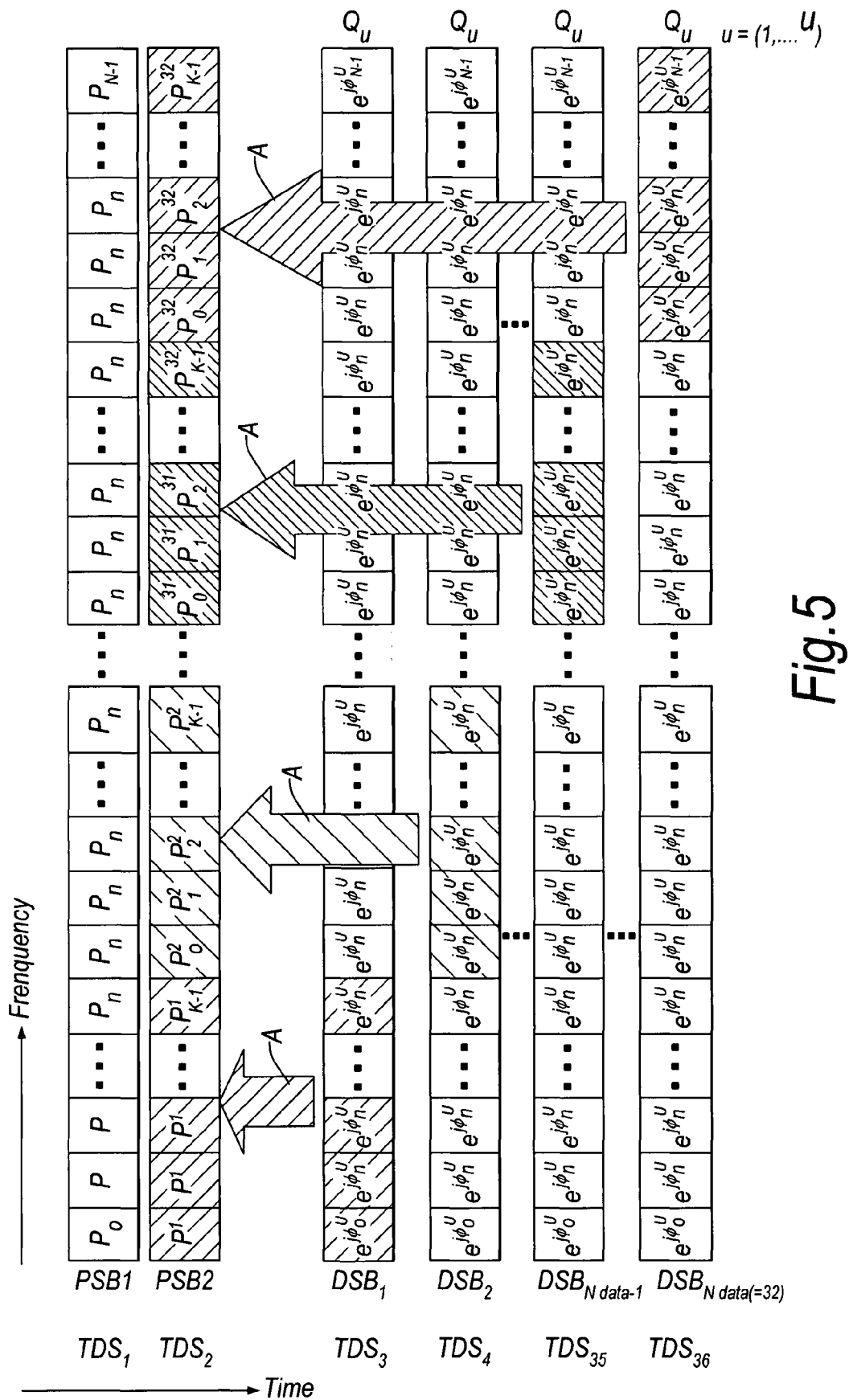
FIG. 5 shows the structure of an information unit according to the first embodiment.

FIG. 5 shows an example structure of an information unit of a multi-carrier signal comprising N sub-carriers according to a first embodiment of the present invention. In this embodiment the pilot signals assigned to carry the phase information are all carried by signals comprised in the second time domain symbol ($TDS_2$) of the information unit. The complete information unit is identical in structure to the information unit shown in FIG. 1 and FIG. 5 illustrates the way in which information about a phase vector $Q_u$ applied to a time domain symbol of the information unit may be provided to, or encoded in, the assigned pilot signals. Only the first two pilot signal blocks, $PSB_1$ and $PSB_2$, the first two data symbol blocks $DSB_1$ and $DSB_2$ and the last two data symbol blocks $DSB_{Ndata-1}$ and $DSB_{Ndata}$, comprised in the information unit $F_1$ are illustrated in FIG. 5, where $N_{data}=32$.

A phase vector, $Q_u$, is applied to each of the data symbol blocks comprised in the information unit shown in FIG. 5. Preferably, each phase vector is selected according to an SLM unit, such as SLM block 18 shown in FIG. 6, and the resultant phase adjusted data symbol block having the lowest PAPR is selected for transmission. $e^{j\Phi_n}$ represents a given phase vector element comprised in the applied phase vector Q, where n=0, 1, ... N−1. Preferably, each of the phase elements comprised in a particular phase vector are unique, and a different phase vector $Q_{u\neq v}$ is applied to the time domain symbols comprised in an information unit of the system. However, it will be appreciated by those skilled in the art that the phase vectors should be sufficiently different so that a vector can be uniquely identified from a number K phase elements of the vector. According to this embodiment, all of the pilot signals forming the second pilot signal block are to be used to carry the phase information. Thus, the designated pilot signals must be assigned to a particular time domain symbol of the information unit. If $N_{data}=16+16=32$ (see FIG. 1) and the number of sub-carriers, N=512 with all sub-carriers comprised in the pilot signal block carrying the same pilot signal(s), then $K=N/N_{data}=512/32=16$, where K is the number of sub-carriers which may be conveniently used to carry phase information for a particular time domain symbol of the information unit F. Thus, K= the number of pilot signals comprised in a "set" of pilot signals. In this particular example, $PSB_2$ will therefore comprise 32 sets of pilot signals, wherein each set of pilot signals comprises 16 pilot signals.

It is convenient for the sets of pilot signals to correlate sequentially to the time domain symbols which have undergone phase adjustment. Thus, the first set of pilot signals $P^1$ carries information about the phase vector applied to the first data symbol block $DSB_1$ forming the information unit. Similarly the second and third etc sets of pilot signals $P^2$ and $P^3$ are respectively provided with information about the second and third etc time domain symbols, $DSB_2$ and $DSB_3$. It should be appreciated that there are numerous other ways in which a set of pilot signals may be assigned to a particular time domain symbol of the information unit. However, it is important that the position of the sub-carrier for which a given pilot signal carries information within a particular time domain symbol is known to, or can be determined by, the receiver so that that the identity of the complete phase vector sequence can be ascertained with reference to a set of possible phase vector sequences. It must also be possible for the receiver to know the positional correlation between each pilot signal assigned to carry phase information and the appropriate sub-carrier in the information unit. As previously explained it is possible for the receiver to be programmed with prior knowledge about this correlation or for the correlation to be signalled to the receiver by the transmitter (e.g. by a TFCI).

Figure 2:
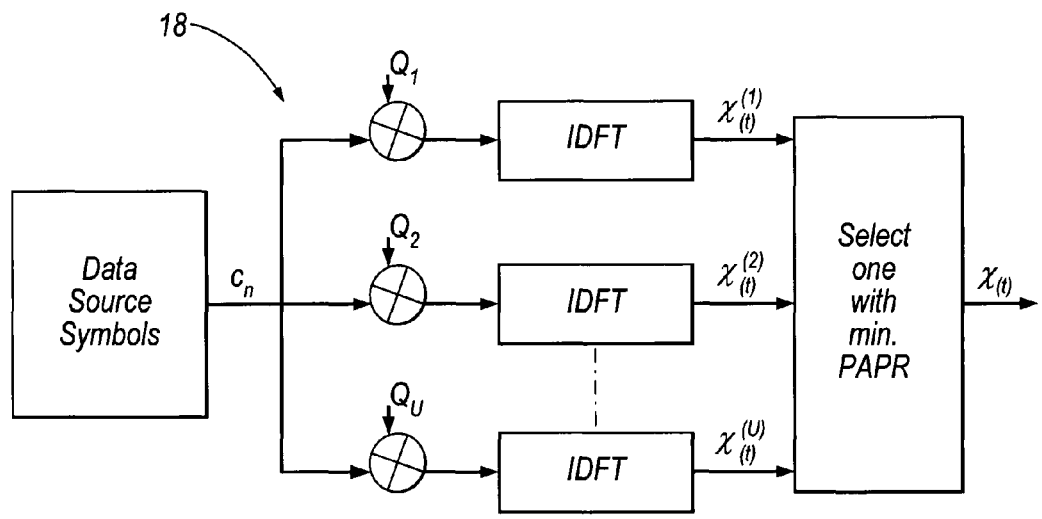
FIG. 2 illustrates a known OFDM transmitter employing an SLM PAR reduction process.
Figure 3:
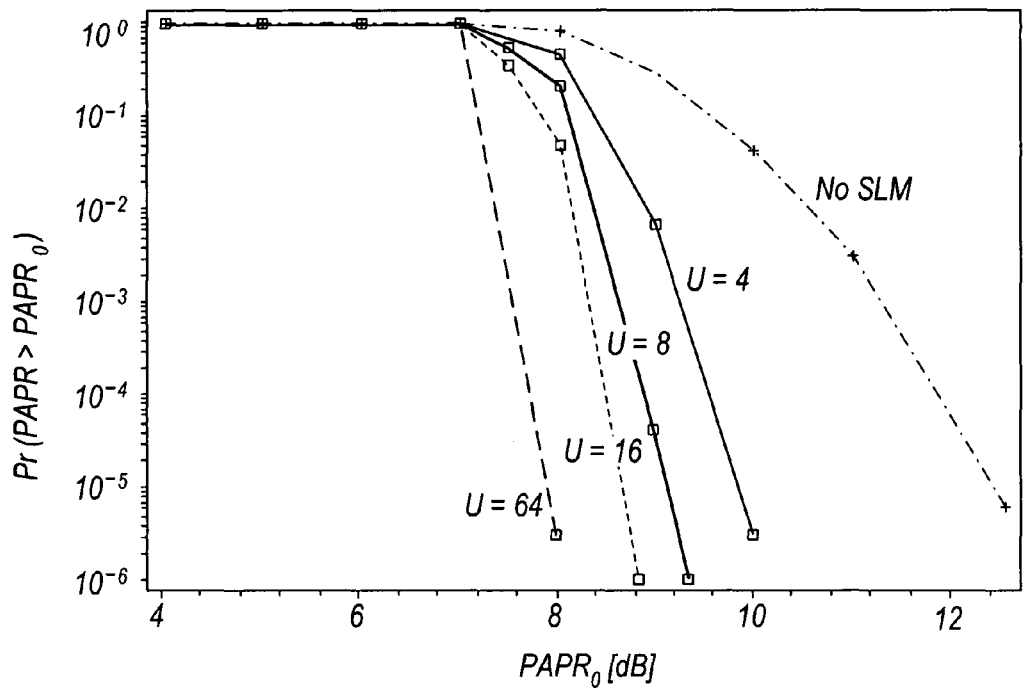
FIG. 3 illustrates the possible PAPR reduction that may be achieved with SLM.
Figure 6:
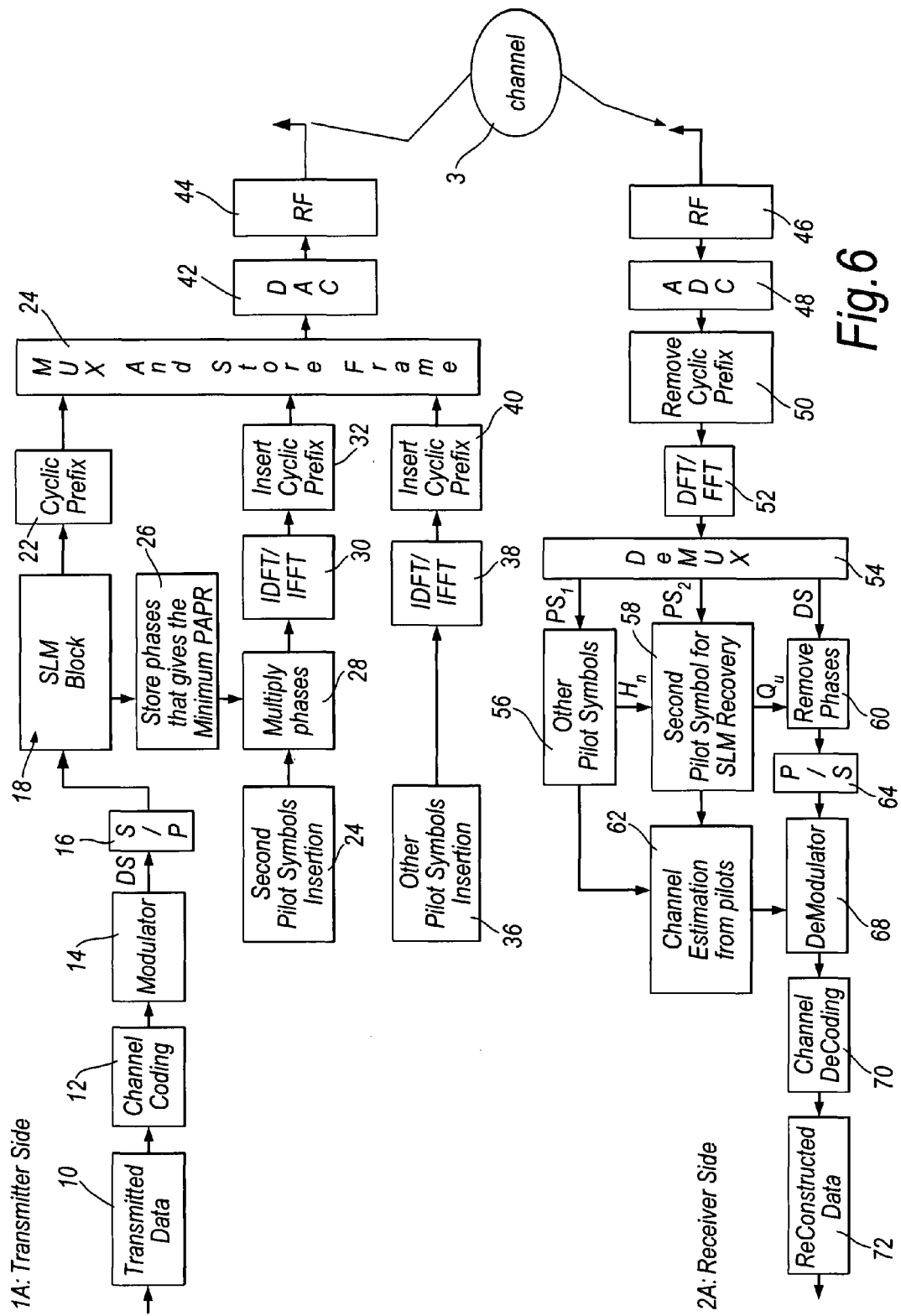
FIG. 6 shows a system block diagram of an OFDM communication system according to a first embodiment of the present invention.

FIG. 6 shows a system block diagram of an OFDM communication system according to a first embodiment of the present invention which is suitable for generating and processing the information unit shown in FIG. 5. The system comprises a transmitter 1A, a receiver 2A, and a multi-path radio channel 3 which links the transmitter 1A to the receiver 2A. In the illustrated OFDM system, the data stream is subjected to coding in a coding block 12, for example Turbo coding with a coding rate of ½ or ¾, and the coded data is then subjected to a predetermined modulation, for example quadrature phase shift keying QPSK in a modulator 14 to obtain a series of data symbols DS. The stream of data symbols are converted to a block of parallel data symbols by means of a serial to parallel converter block 16, and the resulting block of parallel data is input to an SLM block 18, such as the one shown in more detail in FIG. 2, which generates a set of OFDM phase adjusted symbols. A cyclic prefix extension is inserted at the beginning of the OFDM data symbol generated by the SLM block which exhibits the lowest PAPR by means of the CPE insertion block 22. The resultant time domain symbol having a CPE is transmitted to the multiplexer 24 which is operable to initially store successive time domain time domain symbols.

The phase vector selected by the SLM block for each time domain symbol is stored in a phase vector storage unit 26. According to the present embodiment, the second pilot signal block $PSB_2$ shown in FIG. 5 is used to carry the information relating to the phase vectors applied to the phase adjusted time domain symbols. As the phase vectors applied to all of the phase adjusted time domain symbols become known, or once the phase vectors of all the selected time domain symbols comprised in an information unit of the multi-carrier signal are known, encoder 28 multiplies each of the pilot signals comprised in each set of pilot signals by the appropriate phase elements for which a given set is assigned. This process is illustrated by the arrows A shown in FIG. 5. The resultant encoded pilot signal is then mapped onto a set of mathematically orthogonal sub-carriers in the IFFT/IDFT block 30 which performs an Inverse Fourier Transform algorithm. A cyclic prefix extension is inserted at the beginning of the encoded OFDM pilot signal block by means of the CPE insertion block 22 and the resultant symbol block is input to the multiplexer 24 for storage and multiplexing. Other pilot signals which will form, for example, the $PSB_1$ block of pilot signals are inserted by unit 36 and are mapped into an OFDM set of orthogonal sub-carriers by unit 38 and a cyclic prefix extension inserted. Once all of the time domain symbols comprised in an information unit of the system have been provided to the multiplexer, the multiplexer combines the time domain symbols in the correct order to form the required information unit structure. The OFDM symbols are converted into an analog signal by a DAC converter 42 and then converted into a radio frequency (RF) signal by an RF block 44. The RF signal is transmitted to the receiver via the channel 3. In this embodiment, the order of the transmission is $PSB_1$, $PSB_2$, $DSB_2$, $DSB_2$ . . . etc. In this way, the channel estimation required by the receiver to process the information unit can be obtained from $PSB_1$ and then used to process the pilot signal block having the phase information stored therein.

The receiver 2 performs substantially the reverse operation. The received information unit is down-converted into a baseband signal by an RF section 46. The baseband analog signal is converted into a corresponding digital signal by an analog-to-digital converted (ADC) 48. This digital signal comprises successive time domain signals (either pilot signal blocks or data symbol blocks) which are supplied to a CPE removing block 50 before subjecting the output of the CPE removing block 50 to a Fourier transform algorithm in the DFT/FFT block 52. The received information unit is de-multiplexed in unit 54 and the data signals/pilot signals are split into three processing streams. The pilot signals PSI comprised in the first pilot symbol block are sent for channel estimation which is performed by unit 56. The pilot signals PS2 comprised in the second pilot signal block are subject to pilot signal processing to obtain phase information in unit 58 and data symbols DS are sent for phase vector removal. Pilot signals comprised in the second pilot signal block $PSB_2$ are also advantageously used in unit 62 to obtain, or confirm channel estimation, once the phases have been removed from the pilot signal by a phase removing block (not shown).

The second pilot signal PSB2 is processed in unit 58 which comprises a pilot signal processing means according to an embodiment of the present invention for extracting the phase information which has been stored, or encoded, in the assigned pilot signals. Unit 58 comprises a library of phase vectors which may be utilised by the pilot signal processing means to perform trial calculations to recover the encoded phase information. Unit 58 is shown in more detail in FIG. 9 and examples of the way in which the phase information can be extracted from $PSB_2$ by unit 58, and how the identity of the phase vector which was applied to each of the time domain symbols is determined, will be described in detail later. Once the phase information is known, and the phase vectors Qu have been identified, the time domain symbols are processed in unit 60 to remove the phase vector applied prior to transmission so that the data may be recovered. The data is subjected to a parallel-to-serial conversion in unit 64, before being subjected to the demodulator 68 and undergoing channel decoding in unit 70 to obtain the re-constructed data 72.

Figure 7:
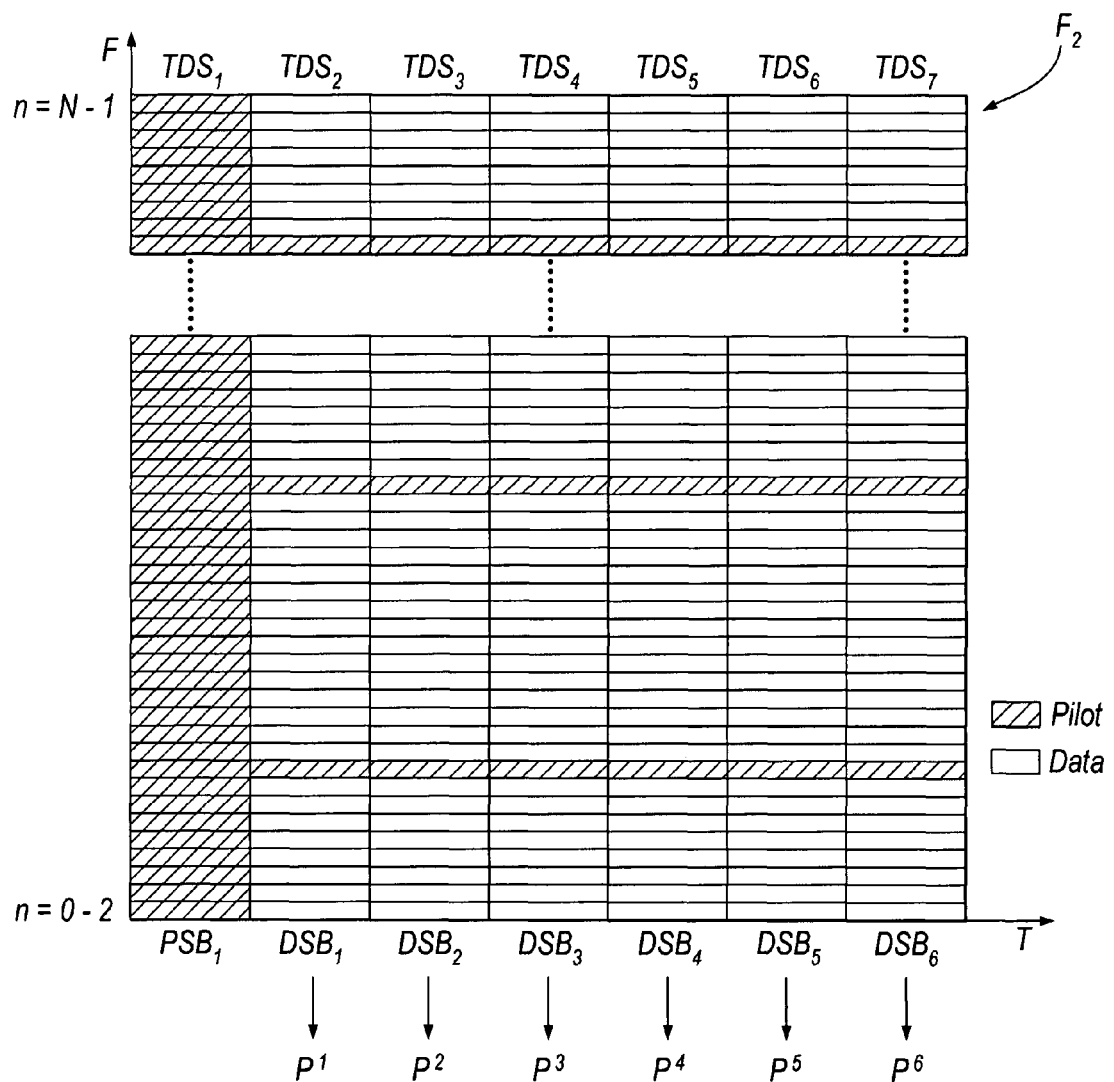
FIG. 7 shows the structure of an information unit according to the second embodiment.

Part of an information unit $F_2$ according to a second embodiment of the present invention is shown in FIG. 7. In this embodiment, the pilot signals assigned to a particular time domain symbol are carried by sub-carriers in the same time interval as the respective time domain symbol. Thus, $TDS_2$, for example, is provided with a set of pilot signals $P^1$. The pilot signals therefore appear to be arranged "within" the time domain symbol for which the pilot signals carry phase vector information. Thus, in a given time domain symbol (e.g. $DSB_1$), a number of the sub-carriers, $N_{pilot}$, are each modulated with the pilot signal whilst the remaining sub-carriers, $N-N_{pilot}$, are modulated with data symbols. It can be seen from FIG. 7 that the pilot signals are scattered within the frequency domain of the time domain symbol. However, the positions of the $N_{pilot}$ sub-carriers within the frequency domain should be known, or determinable by, the receiver. It should be appreciated that the pattern, or arrangement, of the pilot signals within the time domain symbol may vary between consecutive time domain symbols or between consecutive information units. It should also be appreciated that FIG. 7 only shows part of an information unit having $N_{data}$ time domain symbols. As exemplified in FIG. 5, it is usual for the pilot signal block $PBS_1$, which is used for channel estimation, to be repeated in the middle and/or at the end of the information unit.

Figure 8:
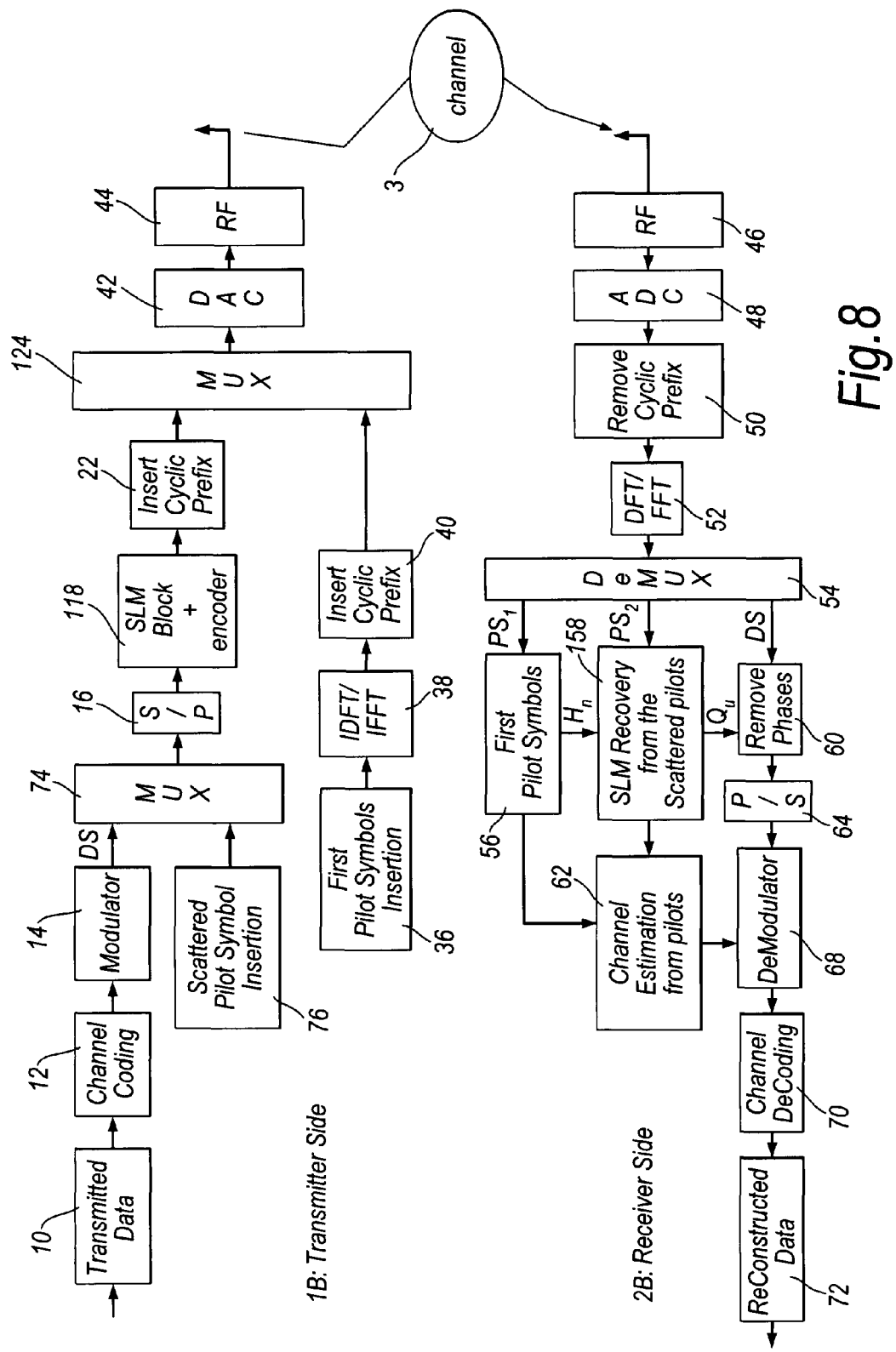
FIG. 8 shows a system block diagram of an OFDM communication system according to a second embodiment of the present invention.

FIG. 8 shows a system block diagram of an OFDM communication system according to a second embodiment of the present invention which is suitable for generating and processing the information unit shown in FIG. 7. The system comprises a transmitter 1B, a receiver 2B, and a multi-path radio channel 3 which links the transmitter 1B to the receiver 2B. Those parts of the system which perform the same or similar function as corresponding parts shown in FIG. 6 have been identified using identical reference numerals and the description of these parts is not repeated.

The structure of the information unit shown in FIG. 7, in particular the way in which a set of pilot signals are scattered at particular frequencies within the assigned time domain symbol has advantages over the first embodiment in that the complexity of the transmitter is reduced. As shown in FIG. 8, the modulated data stream DS is input to a multiplexer 74 together with a plurality of pilot signals. The multiplexer combines the pilot signals and data symbols into a stream of symbols. This stream of symbols, including the pilots, is converted to a succession of parallel symbols by means of a serial-to-parallel converter unit 16. These blocks of parallel symbols are subjected to the SLM and encoder block 118 in order to improve, or optimise, the envelope of the composite of the parallel N signals comprised in the block. Consequently, the sub-carriers onto which each of the pilot signals comprised in the block are modulated will also undergo a phase adjustment. The phase element applied to a particular sub-carrier which carries a pilot signal will depend on the position (i.e. frequency) of the pilot signal in the symbol block. Subjecting a set of pilot signals of known, or determinable, positions within a time domain symbol to the SLM process, therefore provides the signals with information about the phase vector applied to the whole block. Thus, the step of, according to embodiments of the present invention, providing each of the pilot signals with information about the phase adjustment for one said sub-carrier of determinable position within the respective time domain symbol, is performed by the SLM and encoder block 118. A cyclic prefix extension is inserted at the beginning of each of the time domain symbols by means of the CPE insertion block 22 and the resultant symbol block is input to the multiplexer 124 for multiplexing together with the pilot signal block generated by units 36, 38 and 40. In contrast to the transmitter shown in FIG. 6, the multiplexer 124 need not store the time domain symbols prior to transmission.

Figure 9:
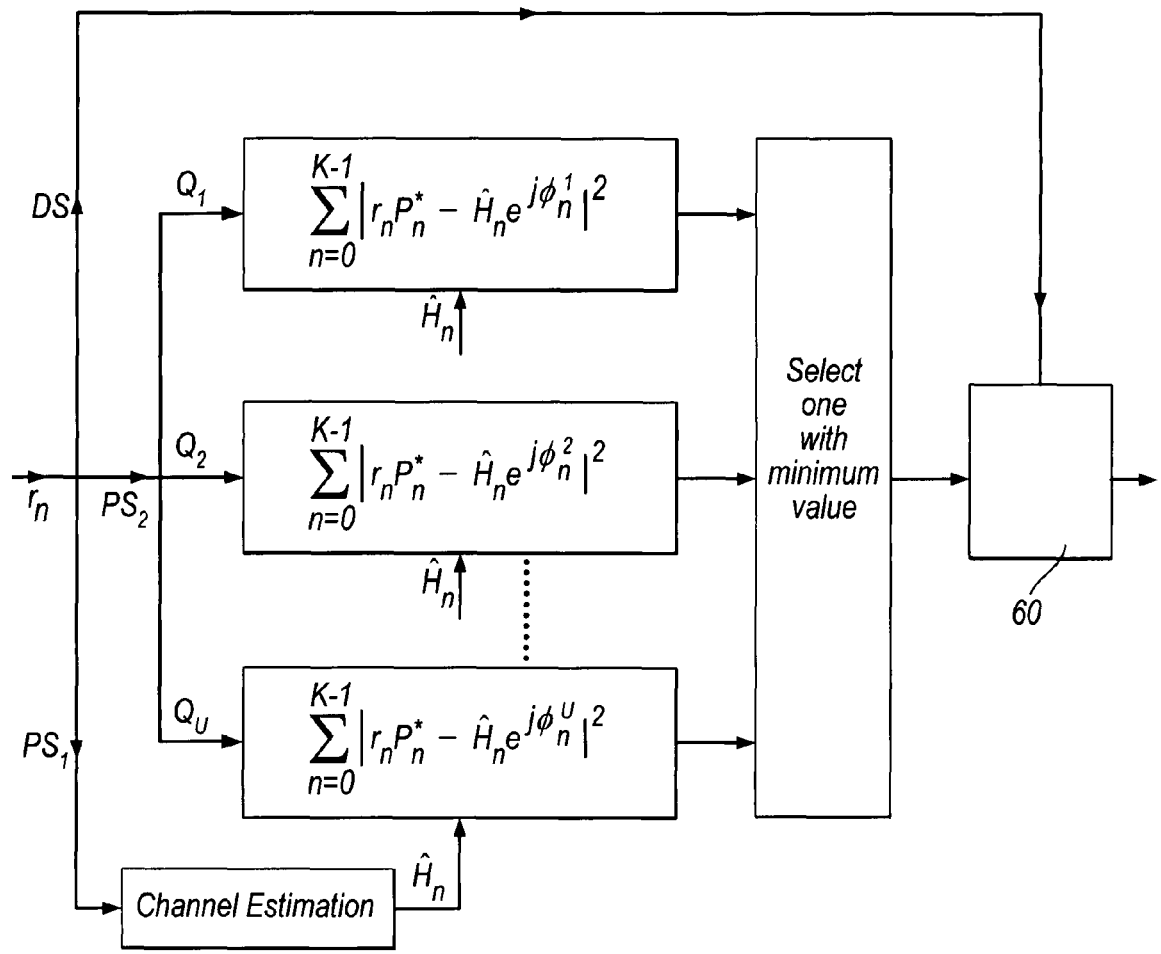
FIG. 9 shows a receiver embodying the present invention.
Figure 10A:
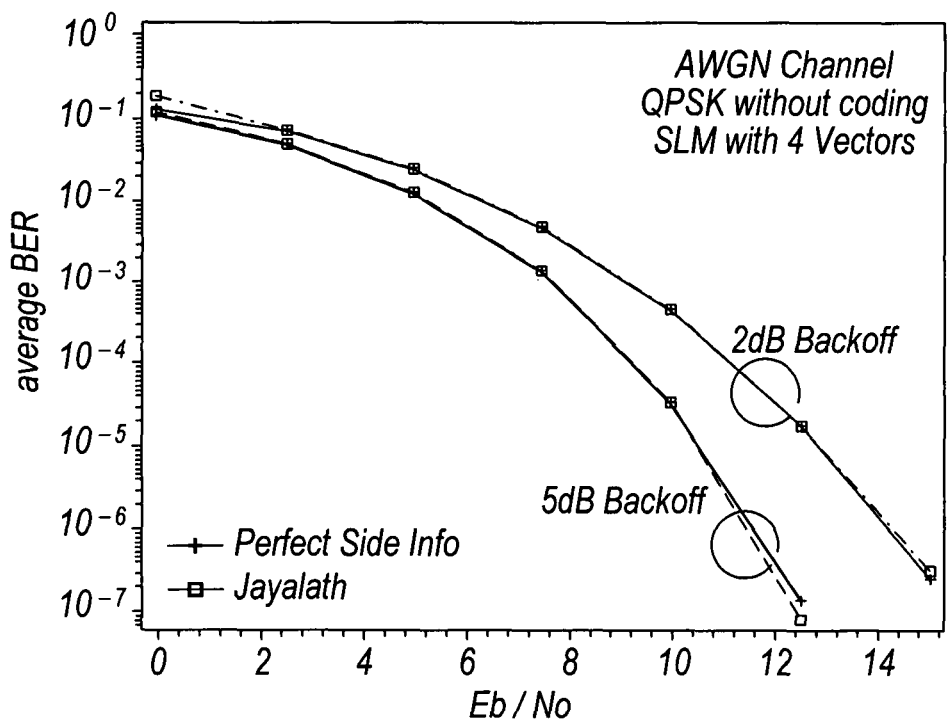
FIGS. 10, 11 and 12 show results of simulations conducted to test the performance of the first embodiment of the present invention.
Figure 10B:
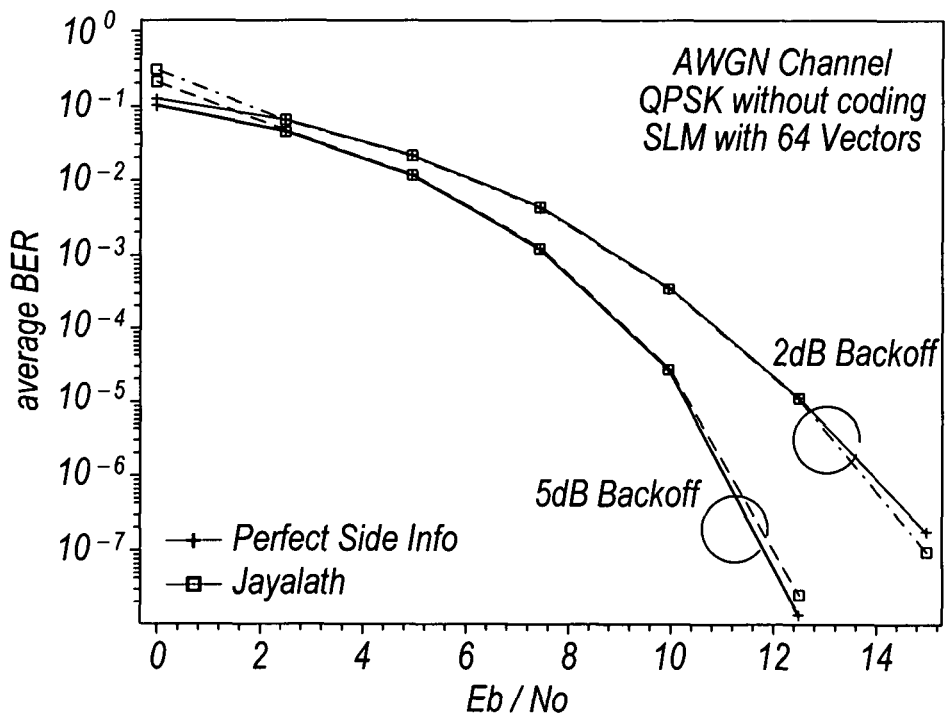
Figure 10C:
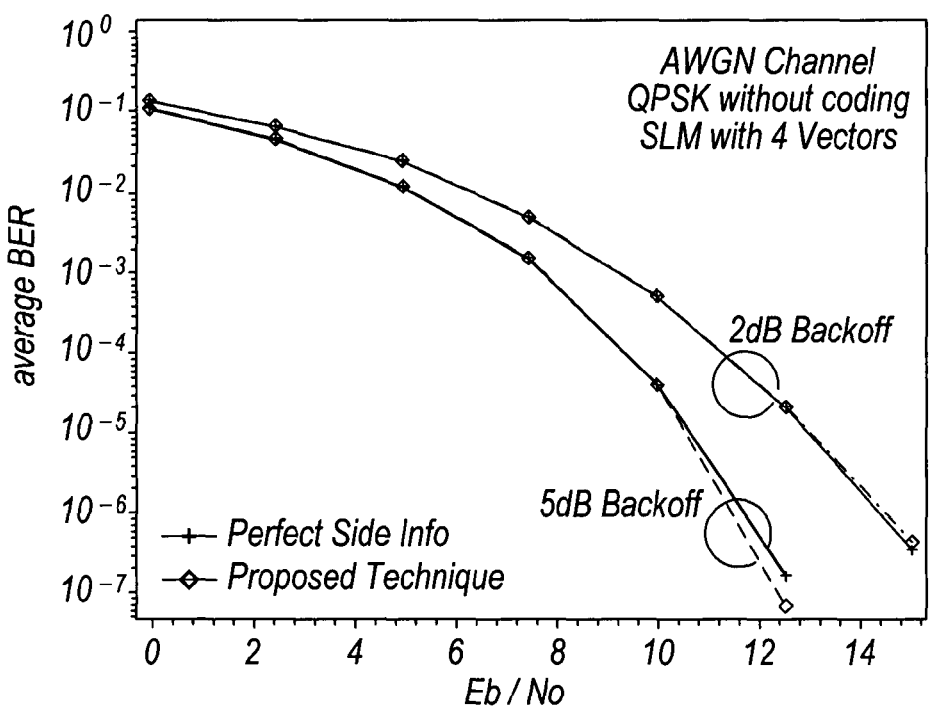
Figure 10D:
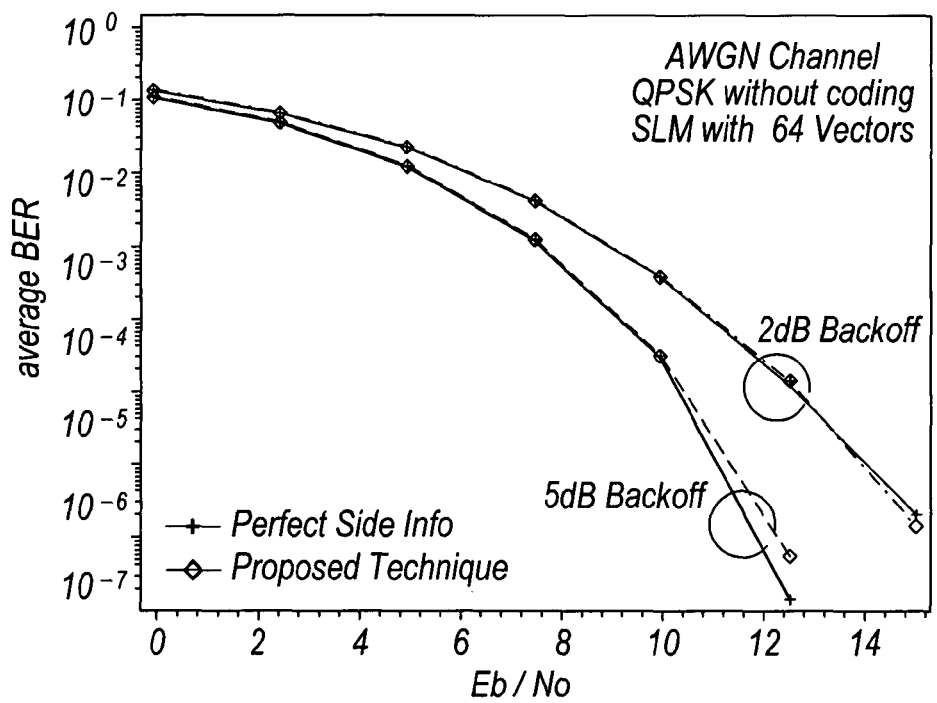
Figure 11A:
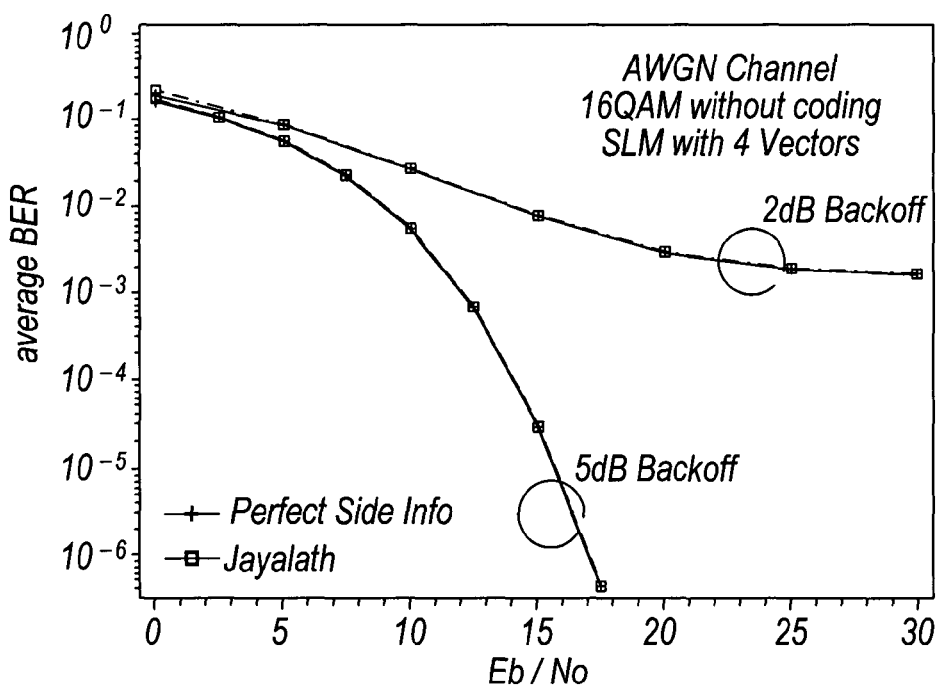
Figure 11B:
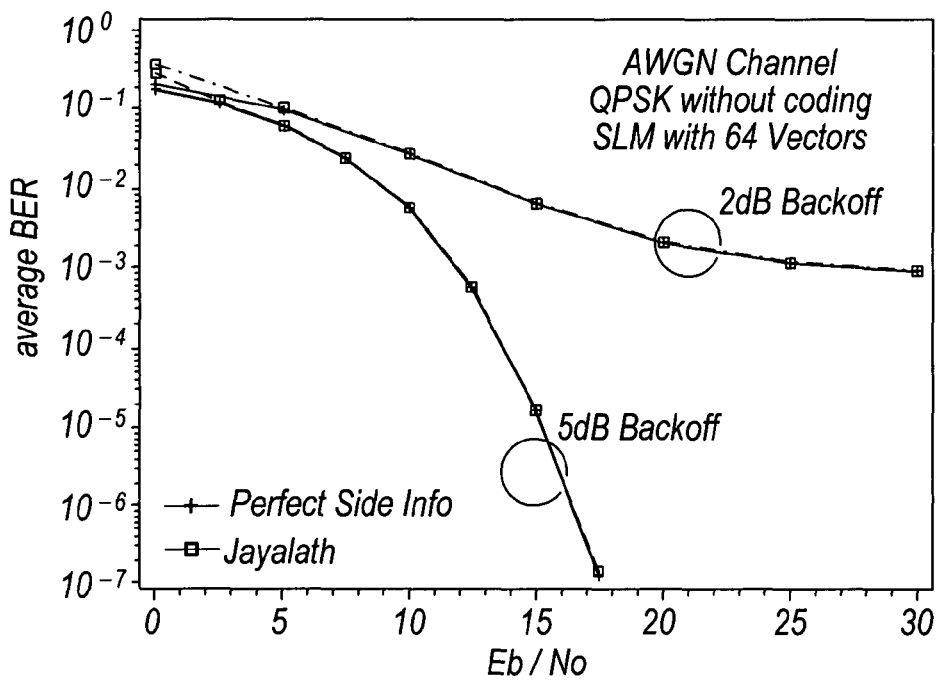
Figure 11C:
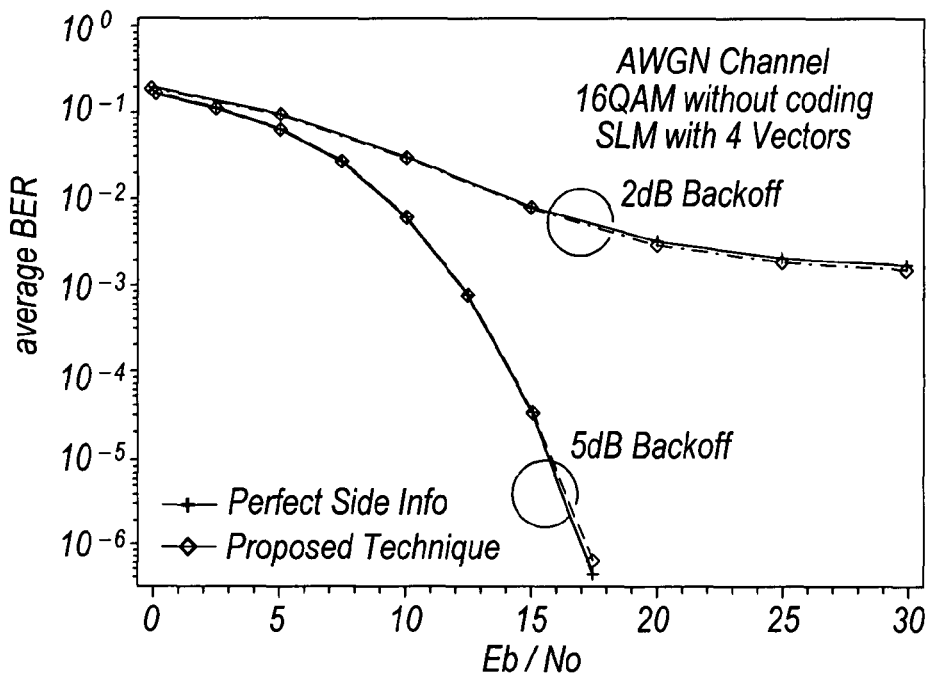
Figure 11D:
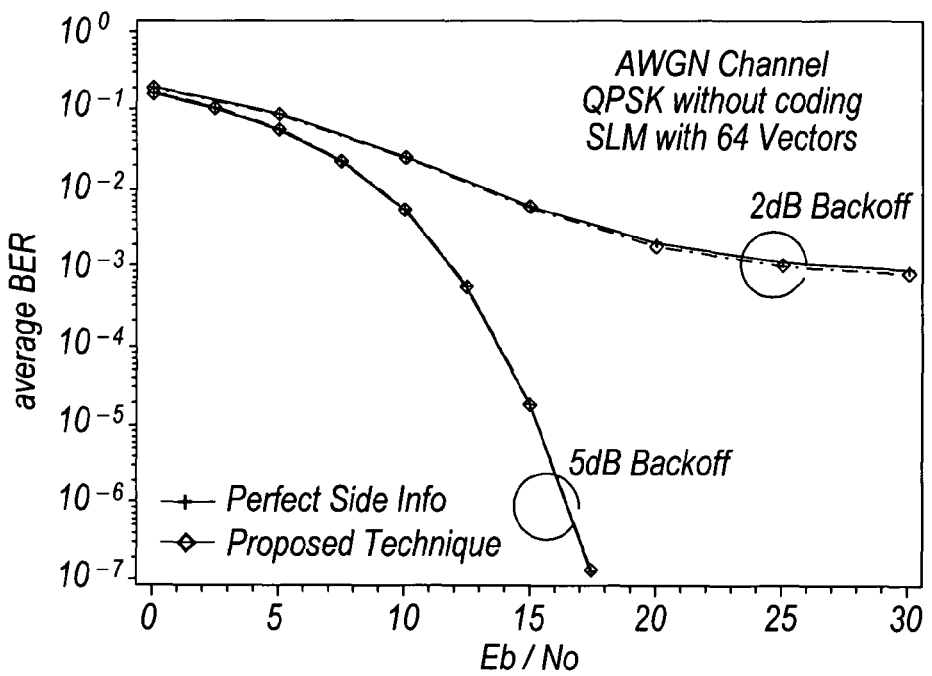
Figure 12A:
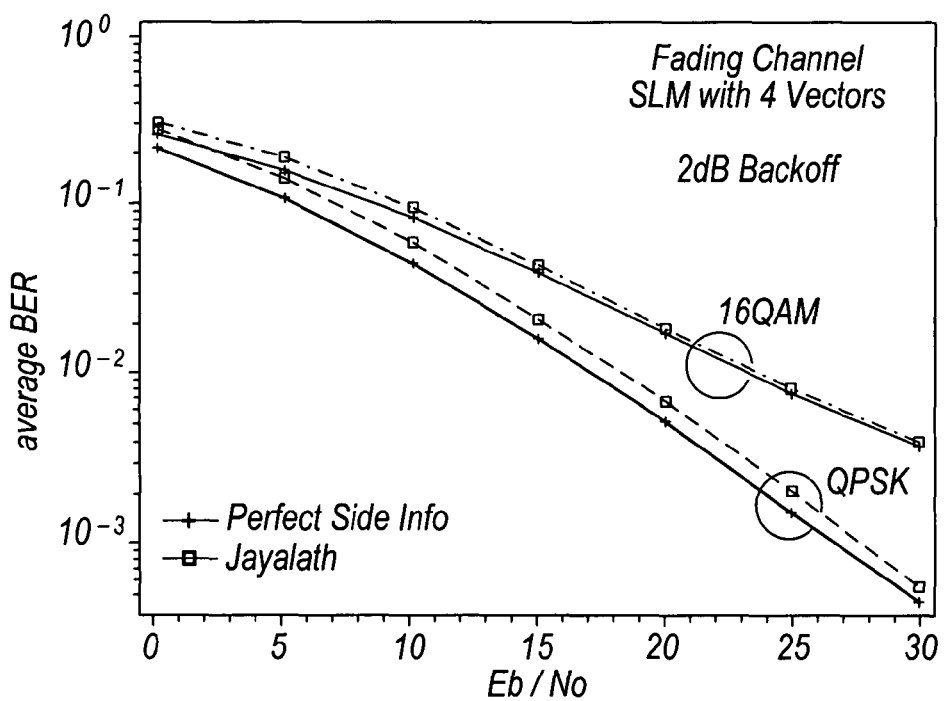
Figure 12B:
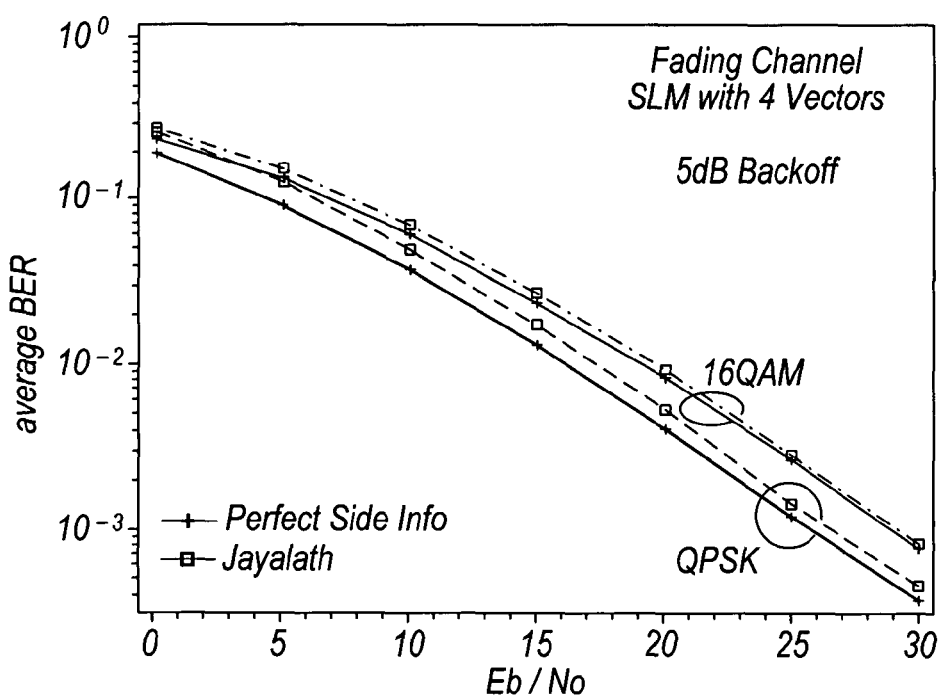
Figure 12C:
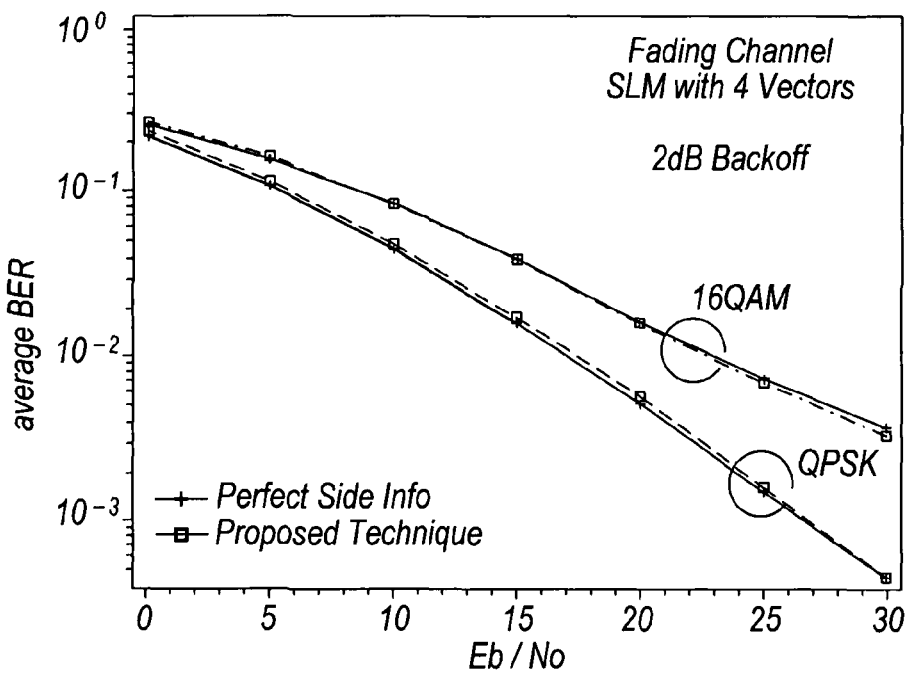
Figure 12D:
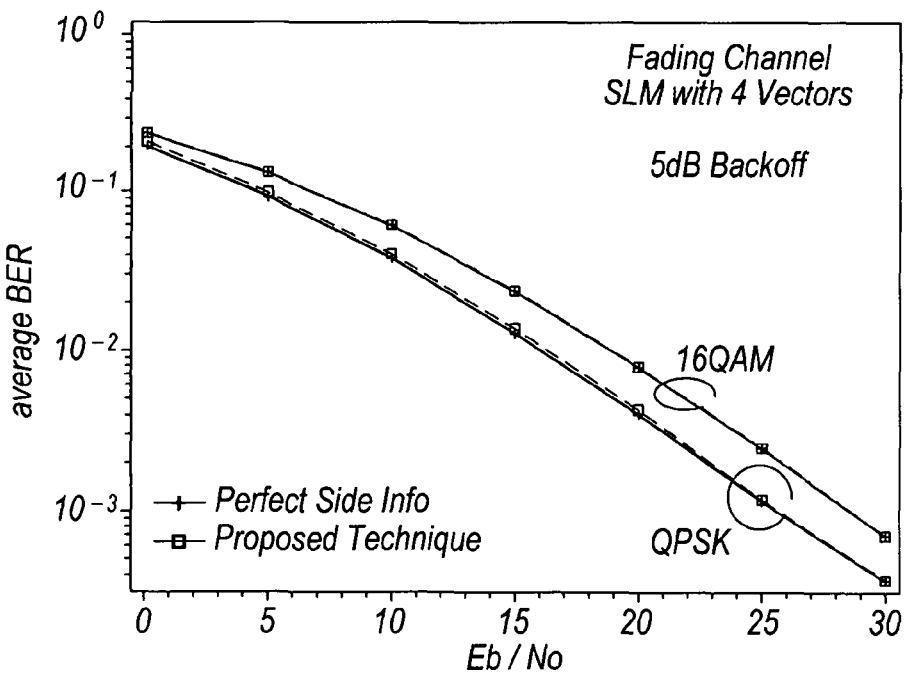
Figure 13A:
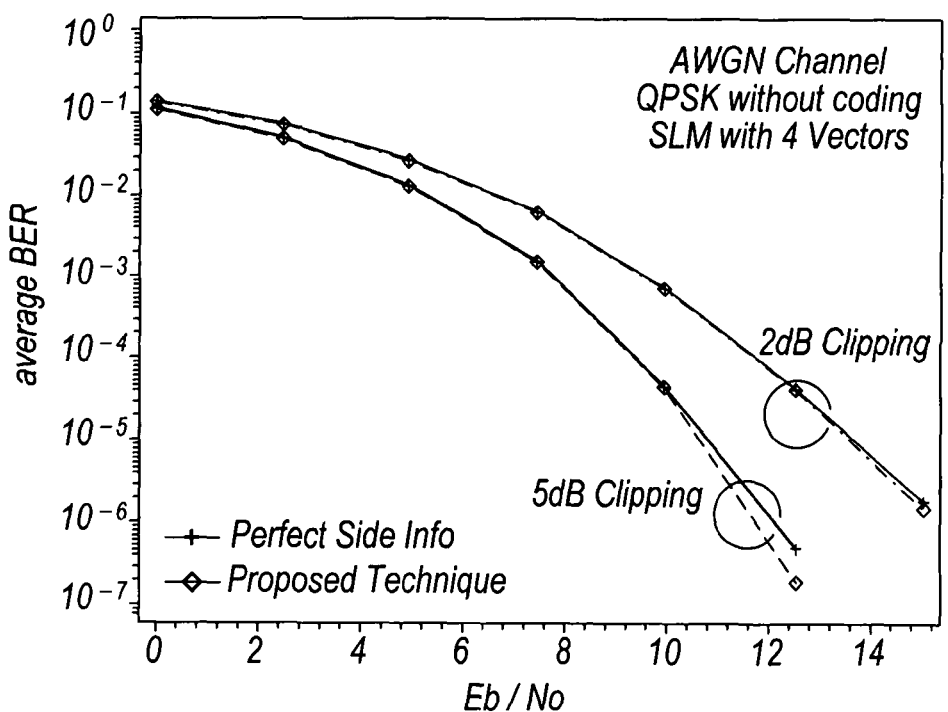
FIGS. 13 and 14 show results of simulations conducted to test the performance of the second embodiment of the present invention.
Figure 13B:
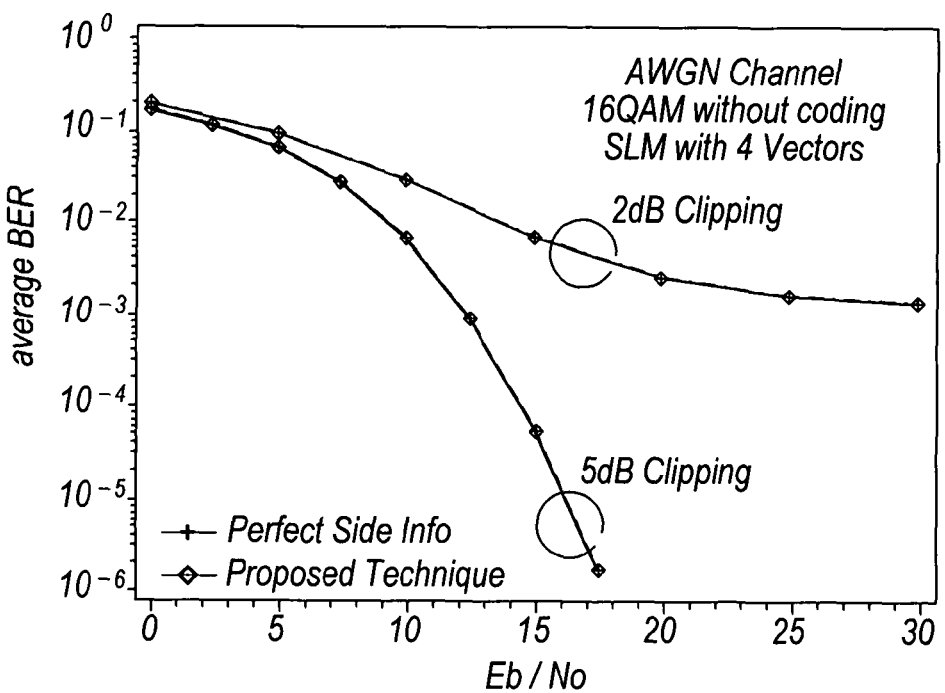
Figure 13C:
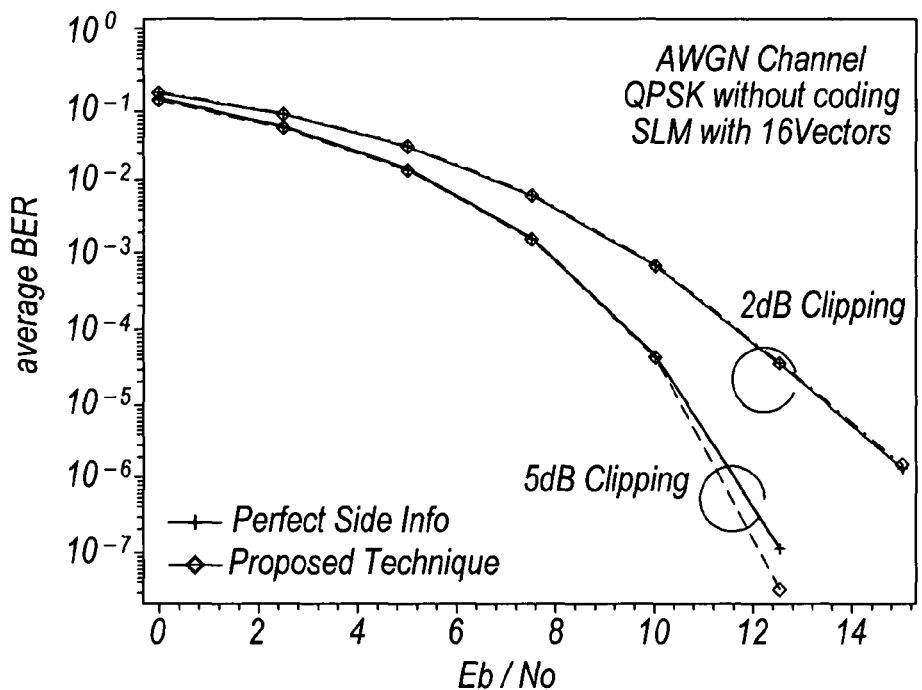
Figure 13D:
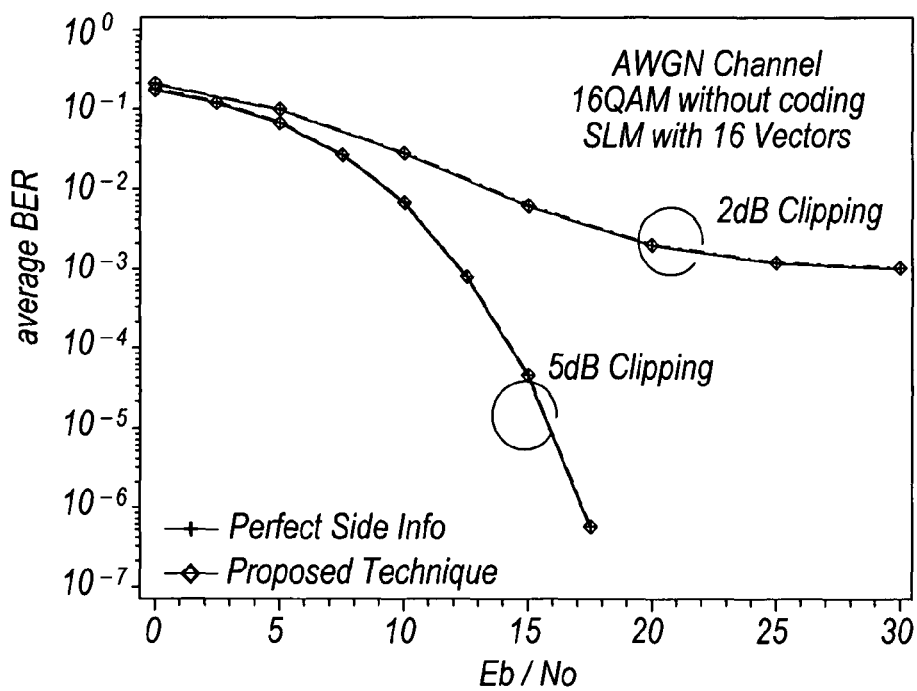

FIG. 9 illustrates an example of a pilot signal processing means, comprising U pilot symbol processing PSP blocks, which may be provided in the receiver unit 58 or 158 shown in FIG. 6 or 8 respectively. A received pilot signal $r_n$ represents a set of received de-multiplexed pilot signals (each set comprising a number K pilot signals; there will be $N_{data}$ set of pilot signals to be processed) assigned to a particular time domain symbol. Each set pilot signals are processed by the pilot signal processing means in order to identify the phase vector that was applied to a particular time domain symbol. The processing involves performing a set of decision metric calculations which utilise a phase element taken from the appropriate position in a trial phase vector chosen from a set U of possible phase vectors. Specifically, a set of U decision metric calculations are performed, for each set of pilot signals, where U is the number of phase vectors comprised in the set of possible phase vector sequences known to the receiver. The total number of calculations is therefore $U*N_{data}*K$ or $U*N$ since $N_{data}*K=N$.

Referring back to FIG. 5 and considering a first set of 16 pilot signals $P_1$ assigned to be provided with the first 16 phase elements applied to the data symbol block $DSB_1$. Each of the received set of 16 pilot signals $r_1$ will be subjected to a series of trial calculations using the first 16 elements of all of the possible vectors Qu. Each of the second set of received pilot signals $r_2$ will be subjected to a series of trial calculations using the second 16 elements of all of the possible vectors Qu etc. Clearly, it is necessary for the correct phase element from each trial phase vector to be processed with the appropriate received pilot signal. With reference to the information unit structure shown in FIG. 7, since the spatial correlation between the position of the sub-carriers for the pilot signals within the time domain symbol and the position of the applied phase element within the phase sequence remains constant for successive time domain symbols, the processing unit will advantageously be able to use phase elements of the same position within the phase vector sequence of the trial phase vectors to process all sets of pilot signals.

The decision metric performed by the pilot signal processing means shown in FIG. 9 is:

$$V_{SLM} = \min_{Q_u} \sum_{n=0}^{K-1} |r_n P_n^* - \hat{H}_n e^{j\phi_n^u}|^2 \quad (5)$$

The trial vector that gives the minimum V value for a given set of pilot signals allows the phase vector applied to corresponding time domain symbol to be identified.

An alternative decision metric which could also be used in the pilot signal processing means is:

$$V_{SLM} = \min_{Q_u} \sum_{n=0}^{K-1} \text{abs}(\arg(r_n P_n^*) - \arg(\hat{H}_n e^{j\phi_n^u})) \quad (6)$$

Both of the above decision metrics calculate two terms for each value of n (where n=0. . . K−1 and K is the number of pilot signals comprised in a given set of pilot signals) and then sum the values obtained for the difference between the second and first term for each set of pilot signal to obtain $V_{SLM}$. Referring firstly to equation 5, the first term $r_n P^*_n$ rrepresents the received pilot signal for each set of pilot signals multiplied by the conjugate of the transmitted pilot signal which is known at the receiver. The second term $\hat{H}_n e^{j\Phi_n^u}$ epresents an estimate of the channel multiplied by the phase element from the appropriate position in a trail phase vector chosen from a set U of possible phase vectors. The received pilot signal rn represents the transmitted pilot signal multiplied by the applied phase element (determined by the SLM procedure) and subjected to the influence of the channel. By multiplying rn by the conjugate of the known pilot signal effectively removes the pilot signal P to leave a representation of the applied phase element and the influence of channel. Thus, if the correct trial vector is selected, these two terms will be close to equal and $r_n P_n^* - \hat{H}_n e^{j\Phi_n^u}$ for a given n will be close to zero.

Similarly, referring to equation 6, the argument of $r_n P^*_n$ is subtracted from the argument of $\hat{H}_n e^{j\Phi_n^u}$ for a given n and the difference will be close to zero.

Those skilled in the art will appreciate that a microprocessor or digital signal processor may be sued in practice to implement some or all of the functions of the pilot signal processing means, the phase vector application means or the encoder of embodiments of the present invention. Such a processor operates according to an operating program to carry out the various functions.

The performance of the present invention was investigated by simulation. The link level simulation assumptions used for the simulation are as follows:

| Parameters | Values |
| --- | --- |
| Carrier Frequency | 5 GHz |
| Propagation conditions | AWGN and Rayleigh fading channel: a)Single Path. b)12 Paths Exponential model with 1 dB gain and 0.20 ms path delay. |
| Vehicle Speed for Flat Fading | 17 kmph (80 Hz) and 207 kmph (960 Hz) |
| Modulation Schemes | QPSK and 16QAM with no coding rates |
| Access | OFDM |
| Bandwidth | 78.336 MHz |
| FFT size | 1024 |
| Useful Sub-Carrier # | 512 |
| Sub-carrier separation | 76.5 KHz |
| Guard Interval (GI) | 200 samples |
| Spreading factor (SF) | No spreading |
| Symbol Duration | 15.62 us ($T_u$: 13.05 us and GI: 2.55 us) |
| Frame Duration | 0.59 ms (32 data + 6 pilots) |
| Interleaving | None |
| Channel Estimation (CE) | Interpolation (Non-Ideal CE) |
| Fast fading model | Jakes spectrum |
| Channel coding | Turbo code |
| Tail bits | 6 and k = 4 |
| No. of iterations for Turbo Coder | 8 |
| Metric for Turbo Coder | Max-Log-MAP |
| Input to Turbo Decoder | Soft |
| EbNo per info bit | Varies |
| Antenna Diversity | Tx/Rx = 1/1 |

Performance Simulation Results—Embodiment 1 (pilot signal block)

Figure 4:
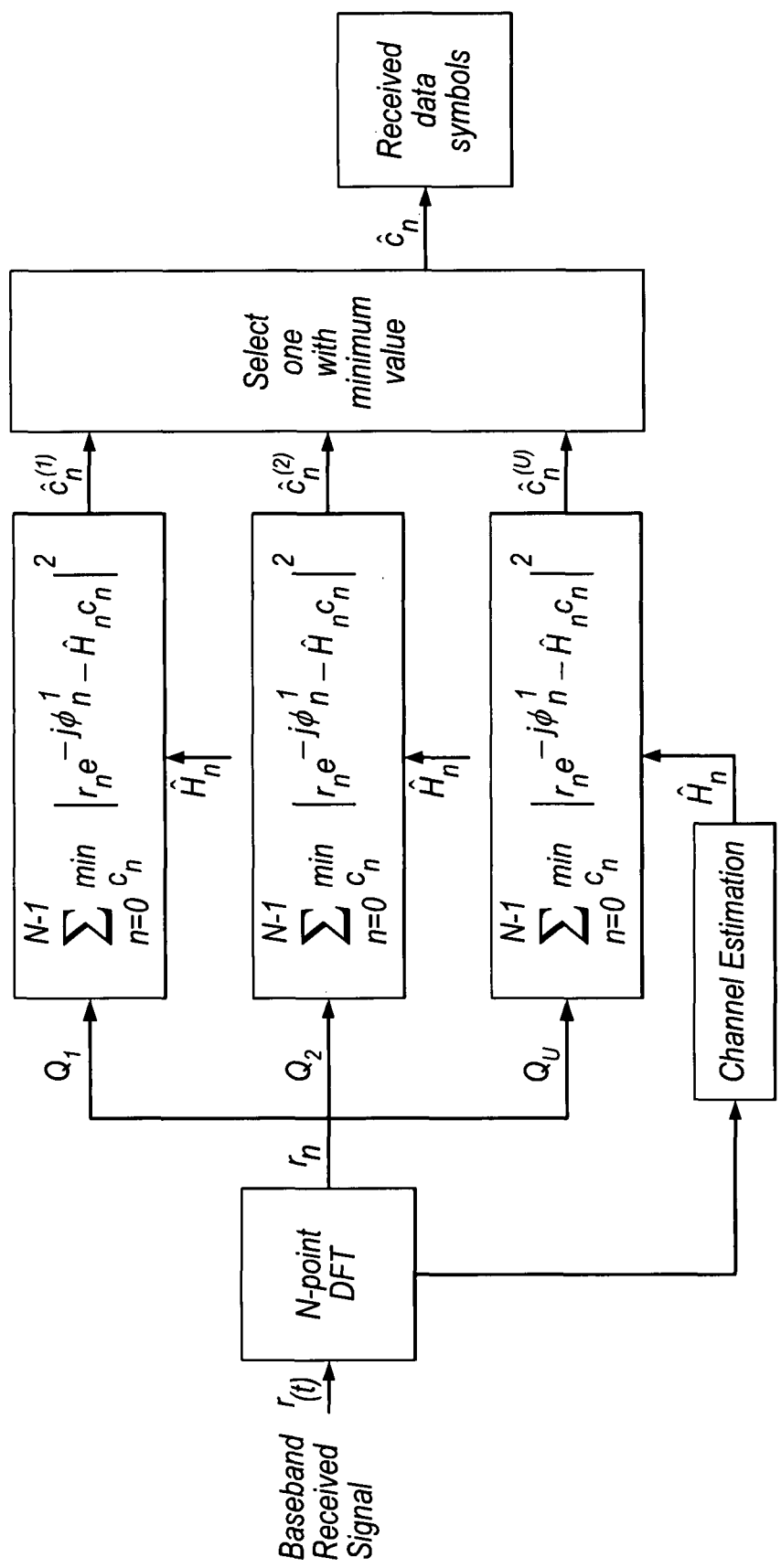
FIG. 4 illustrates a receiver according to the prior art.

The performance of the first embodiment of the present invention, which utilises an information unit structure as shown in FIG. 5 having a block of pilot signals for carrying the phase information for all of the time domain symbols comprised in the information unit is analysed and compared to i) the basic SLM technique, which uses perfect signalling (i.e. ideal side information) and ii) the technique proposed by Jayalath and Tellambura which uses a blind receiver as shown in FIG. 4. The performance is tested over AWGN channel, fading channel and with amplifier non-linearity using the link level simulation assumptions listed previously for QPSK and 16QAM modulation schemes.

FIGS. 10 and 11 shows a comparison of the BER performance of a communication system embodying the present invention (c) and (d) with the BER performance of a communication system as proposed by Jayalath et al (a) and (b) with 2 dB and 5 dB backoff values for QPSK (FIG. 10) and 16QAM (FIG. 11) modulation schemes without coding. Both results are compared with the performance expected using perfect side information. It can be seen from these simulations that the communication system embodying the present invention has an identical BER performance as that expected using the basic SLM technique with perfect side information. However, the Jayalath technique shows performance degradation in low EbNo values.

Furthermore, FIG. 12 shows a similar BER performance comparison, this time over a one path fading channel with 2 dB and 5 dB backoff values for QPSK and 16QAM modulation schemes without coding. It can be observed that the communication system embodying the present invention (FIGS. 12c and 12d) has an identical performance as that shown using the basic SLM technique with perfect side information (FIGS. 12a and 12b). However, the Jayalath technique shows performance degradation of approximately 0.75 dB in all EbNo values.

Performance Simulation Results—Embodiment 2 (scattered pilots)

The performance of the second embodiment of the present invention, which utilises an information unit structure as shown in FIG. 7 is analysed and compared to the basic SLM technique, which uses perfect signalling (i.e. ideal side information). The performance is tested over AWGN channel, fading channel and with amplifier non-linearity using the link level simulation assumptions listed previously for QPSK and 16QAM modulation schemes.

FIG. 13 shows a comparison of the BER performance of a communication system embodying the present invention with the BER performance of a communication system using the basic SLM technique with 2 dB and 5 dB clipping (i.e. backoff) values for QPSK ((a) and (c)) and 16QAM ((b) and (d)) modulation schemes without coding. Both results are compared with the performance expected using perfect side information. It can be seen from these simulations that the communication system embodying the present invention has an identical BER performance as that expected using the basic SLM technique with perfect side information.

Figure 14A:
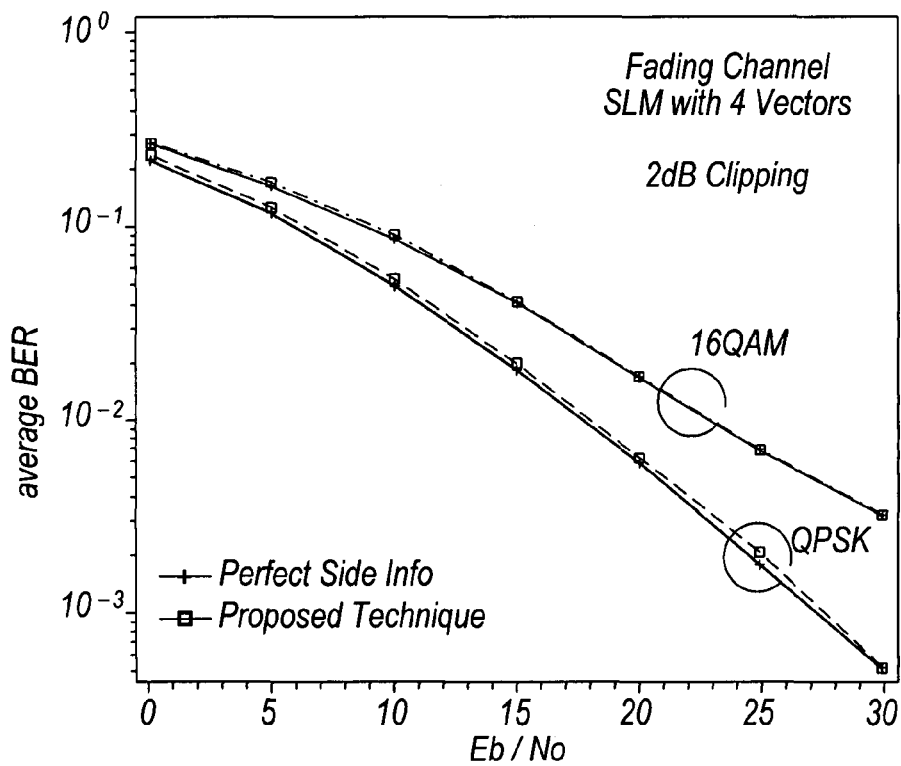
Figure 14B:
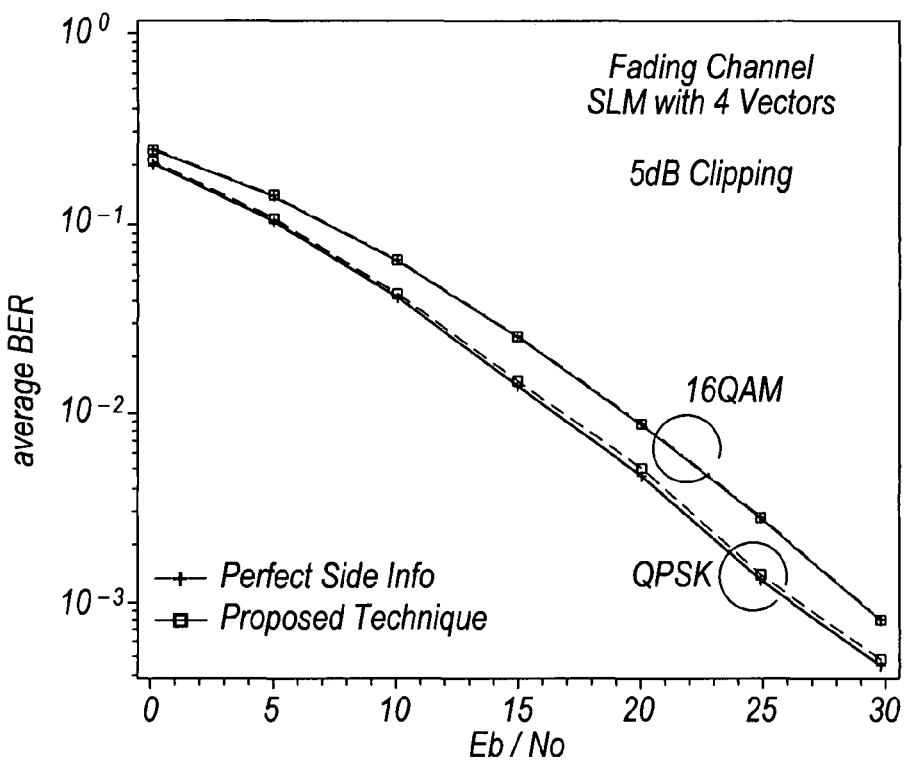

FIG. 14 shows a similar BER performance comparison, this time over a one path fading channel with 2 dB (FIG. 14a) and 5 dB (FIG. 14b) backoff values for QPSK and 16QAM modulation schemes without coding. It can be observed that the communication system embodying the present invention has an identical performance as that shown using the basic SLM technique with perfect side information (FIGS. 14a and 14b).

The invention claimed is:

1. A communication method in which a succession of time domain symbols are transmitted by a transmitter to one or more receivers, each time domain symbol comprising a plurality of signals which are transmitted in parallel by the transmitter, the signals including data signals or pilot signals, the method comprising:

at the transmitter, providing a set of pilot signals assigned to a given time domain symbol with information about a phase vector applied to the signals comprised in the said time domain symbol, the phase vector comprising a sequence of phase elements wherein the phase of each signal of the time domain symbol is adjusted by one said phase element, wherein each of the pilot signals comprised in the set of pilot signals is provided with information about the phase adjustment for one said signal of determinable position within the said time domain symbol and each of the pilot signals assigned to the given time domain signal is adjusted by a different phase element of the phase vector so that each of the set of the pilot signals is provided with information about the phase adjustment for each of the given time domain symbols, and wherein the set of pilot signals assigned to the time domain symbol are carried by signals comprised in a different time domain symbol.

2. The method as claimed in claim 1, wherein a given time domain symbol comprises a plurality of pilot signals which are assigned in sets of pilot signals to a plurality of other time domain symbols, a phase vector having been applied to each of the said plurality of other time domain symbols, wherein each set of pilot signals is provided with information about the phase vector applied to the time domain symbols assigned to that set.

3. The method as claimed in claim 2, wherein the sets of pilot signals respectively correlate sequentially to the assigned time domain symbols.

4. The method as claimed in claim 1, wherein the phase vector applied to the given time domain symbol is selected from a set of possible phase vectors.

5. The method as claimed in claim 4, wherein the selection of the phase vector is based on a consideration of the reduction in the ratio of peak-to-average-power which can be achieved by applying the selected vector to the time domain symbol.

6. The method as claimed in claim 1, wherein the phase vector applied to the given time domain symbol is selected from a set of possible phase vectors.

7. The method as claimed in claim 6, further comprising the step of storing information about the selected phase vector in a phase vector storage unit for subsequent use in the step of providing said set of pilot signals with information about the selected phase vector.

8. The method as claimed in claim 1, wherein the time domain symbols are subjected to an inverse Fourier transform algorithm (IFFT/IDFT) to form an OFDM symbol.

9. The method as claimed in claim 1, further comprising, at the receiver processing the set of pilot signals assigned to a given time domain symbol to determine the information about the phase adjustment made to one said signal of determinable position comprised in said given time domain symbol.

10. The method as claimed in claim 9, wherein the receiver identifies the phase vector applied to the given time domain symbol from consideration of a set of possible phase vectors.

11. The method as claimed in claim 8, wherein the processing performed by the receiver involves performing a plurality of calculation operations, each calculation operation utilising a phase element taken from a predetermined position in a trial phase vector chosen from a set of possible phase vectors.

12. The method as claimed in claim 8, wherein the position of the element in a trial vector is determined by consideration of i) the position of the signal about which the pilot signal is provided with information within the given time domain symbol and the sequence of phase elements comprised in the trial phase vector.

13. The method as claimed in any one of claim 8, wherein the receiver performs the following calculation in order to process the set of pilot signals:

$$V_{SLM} = \min_{Q_u} \sum_{n=0}^{K-1} |r_n P_n^* - \hat{H}_n e^{j\phi_n^u}|^2$$

$r_n$ is the received set of pilot signals, $P_n^*$ is the conjugate of the phase symbol, and
$\hat{H}_n e^{j\Phi_n}$ is an estimate of the channel impulse response multiplied by the phase element taken from the trial phase vector.

14. The method as claimed in claim 8, wherein the receiver performs the following calculation in order to process the set of pilot signals:

$$V_{SLM} = \min_{Q_u} \sum_{n=0}^{K-1} \text{abs}(\arg(r_n P_n^*) - \arg(\hat{H}_n e^{j\phi_n^u}))$$

where $r_n$ is the received set of pilot signals, $P_n^*$ is the conjugate of the phase symbol, and
$\hat{H}_n e^{j\Phi_n}$ is an estimate of the channel impulse response multiplied by the phase element taken from the trial phase vector.

15. A transmitter for transmitting a succession of time domain symbols to one or more receivers, each time domain symbol comprising a plurality of signals which are transmitted in parallel by the transmitter, wherein the signals may comprise data signals or pilot signals, the transmitter comprising:
i) a phase adjustment unit for applying a phase vector to the signals comprised in time domain symbol, the phase vector comprising a sequence of phase elements, wherein the phase of each signal of the time domain symbol is adjusted by one said phase element; and
ii) a phase encoding unit for providing a plurality of pilot signals assigned to the said time domain symbol with phase information about the phase adjustment for one said signal of determinable position within said time domain symbol, wherein each of the pilot signals assigned to the given time domain signal is adjusted by a different phase element of the phase vector so that each of the set of the pilot signals is provided with information about the phase adjustment for each of the given time domain symbols, and
wherein the set of pilot signals assigned to the time domain symbol are carried by signals comprised in a different time domain symbol.

16. The transmitter as claimed in claim 15, further comprising a phase vector selection unit which selects the phase vector applied to a given time domain symbol from a set of possible phase vectors.

17. The transmitter as claimed in claim 16, wherein the phase vector selection unit selects the phase vector based on a consideration of the reduction in the ratio of peak-to-average-power which can be achieved by applying the selected vector to the time domain symbol.

18. The transmitter as claimed in claim 15, further comprising a phase vector selection unit which selects the phase vector applied to a given time domain symbol from a set of possible phase vectors.

19. The transmitter as claimed in claim 18, further comprising a phase vector storage unit for storing information about the selected phase vector for subsequent use by the phase encoding means.

20. The transmitter as claimed in claim 15, further comprising an DFT block which subjects one or more of the time domain symbols to an inverse discrete Fourier transform algorithm to form an OFDM symbol.

21. A receiver for receiving a succession of time domain symbols from a transmitter, each time domain symbol comprising a plurality of signals which were transmitted in parallel by the transmitter, wherein the signals may comprise data signals or pilot signals, the receiver comprising:
a pilot signal processing unit for processing a set of pilot signals assigned to a given time domain symbol to determine information about a phase vector applied to the signals comprised in said given time domain symbol by the transmitter, the phase vector comprising a sequence of phase elements, wherein the phase of each signal of the time domain symbol has been adjusted by one said phase element, wherein each of the pilot signals comprised in said set of pilot signals are processed to obtain information about the phase adjustment made to one said signal of determinable position within the said time domain symbol and and wherein the pilot signal processing unit is operable to process pilot signal which are received in a different time domain symbol than said given time domain symbol.

22. The receiver as claimed in claim 21, wherein the pilot signal processing means utilises the information about a phase vector applied to said given time domain symbol to identify the said phase vector from consideration of a set of possible phase vectors.

23. The receiver as claimed in claim 22, wherein said set of possible phase vectors are stored in a library of phase vectors provided in the receiver.

24. The receiver as claimed in claim 21, wherein the pilot signal processing means performs a plurality of calculation operations, each calculation operation utilising a phase element taken from a predetermined position in a trial phase vector chosen from the set of possible phase vectors.

25. The receiver as claimed in claim 24, wherein the position of the element in a trial phase vector is determined by the receiver from consideration of i) the position of the signal about which the pilot signal is provided with information within the given time domain symbol; and ii) the sequence of phase elements comprised in the trial phase vector.

26. The receiver as claimed in claim 24, wherein the receiver performs the following calculation in order to process the set of pilot signals:

$$V_{SLM} = \min_{Q_u} \sum_{n=0}^{K-1} |r_n P_n^* - \hat{H}_n e^{j\phi_n^u}|^2$$

$r_n$ is the received set of pilot signals, $P_n^*$ is the conjugate of the phase symbol, and $\hat{H}_n e^{j\Phi_n^u}$ is an estimate of the channel impulse response multiplied by the phase element taken from the trial phase vector.

27. The receiver as claimed in claim 24, wherein the receiver performs the following calculation in order to process the set of pilot signals:

$$V_{SLM} = \min_{Q_u} \sum_{n=0}^{K-1} \text{abs}(\arg(r_n P_n^*) - \arg(\hat{H}_n e^{j\phi_n^u}))$$

where $r_n$ is the received set of pilot signals, $P_n^*$ is the conjugate of the phase symbol, and $\hat{H}_n e^{j\Phi_n^u}$ is an estimate of the channel impulse response multiplied by the phase element taken from the trial phase vector.

28. The receiver as claimed in claim 21, further comprising a DFT/FFT unit for subjecting a received time domain symbol to a Fourier transform algorithm.

29. A system comprising a transmitter for transmitting a succession of time domain symbols to one or more receivers, each time domain symbol comprising a plurality of signals which are transmitted in parallel by the transmitter, wherein the signals may comprise data signals or pilot signals, the transmitter comprising:
   i) a phase adjustment unit for applying a phase vector to the signals comprised in time domain symbol, the phase vector comprising a sequence of phase elements, wherein the phase of each signal of the time domain symbol is adjusted by one said phase element: and
   ii) a phase encoding unit for providing a plurality of pilot signals assigned to the said time domain symbol with phase information about the phase adjustment for one said signal of determinable position within said time domain symbol, wherein each of the pilot signals assigned to the given time domain signal is adjusted by a different phase element of the phase vector so that each of the set of the pilot signals is provided with information about the phase adjustment for each of the aiven time domain symbols, and wherein the set of pilot signals assigned to the time domain symbol are carried by signals comprised in a different time domain symbol; and a receiver for receiving a succession of time domain symbols from a transmitter, each time domain symbol comprising a plurality of signals which were transmitted in parallel by the transmitter, wherein the signals may comprise data signals or pilot signals, the receiver comprising:

a pilot signal processing unit for processing a set of pilot signals assigned to a given time domain symbol to determine information about a phase vector applied to the signals comprised in said given time domain symbol by the transmitter, the phase vector comprising a sequence of phase elements, wherein the phase of each signal of the time domain symbol has been adjusted by one said phase element, wherein each of the pilot signals comprised in said set of pilot signals are processed to obtain information about the phase adjustment made to one said signal of determinable position within the said time domain symbol and wherein the pilot signal processing unit is operable to process.

30. A communication method in which a succession of time domain symbols are transmitted by a transmitter to one or more receivers, each time domain symbol comprising a plurality of signals which are transmitted in parallel by the transmitter, wherein the signals may comprise data signals or pilot signals, the method comprising:
   at the receiver, processing a set of pilot signals assigned to a given time domain symbol to determine information about a phase vector applied to the signals comprised in said given time domain symbol by the transmitter, the phase vector comprising a sequence of phase elements, wherein the phase of each signal of the time domain symbol has been adjusted by one said phase element, wherein each of the pilot signals comprised in said set of pilot signals are processed to obtain information about the phase adjustment made to one said signal of determinable position within the said time domain symbol and and wherein the pilot signals to be processed are received in a different time domain symbol than said given time domain symbol.

31. An operating program stored on a tangible non-transitory computer readable medium which, when executed by a processor in a transmitter adapted to transmit a succession of time domain symbols, causes the transmitter to carry out the method of claim 1.

32. An operating program stored on a tangible non-transitory computer readable medium which, when executed by a processor in a receiver adapted to receive a succession of time domain symbols, causes the receiver to carry out the method of claim 30.

33. An operating program as claimed in claim 32, wherein the receiver performs the following calculation in order to process the set of pilot signals:

$$V_{SLM} = \min_{Q_u} \sum_{n=0}^{K-1} |r_n P_n^* - \hat{H}_n e^{j\phi_n^u}|^2$$

$r_n$ is the received set of pilot signals, $P_n^*$ is the conjugate of the phase symbol, $\hat{H}_n e^{j\Phi_n^u}$ and is an estimate of the channel impulse response multiplied by the phase element taken from the trial phase vector.

34. An operating program as claimed in claim 32, wherein the receiver performs the following calculation in order to process the set of pilot signals:

$$V_{SLM} = \min_{Q_u} \sum_{n=0}^{K-1} \text{abs}\left(\arg(r_n P_n^*) - \arg\left(\hat{H}_n e^{j\phi_n^u}\right)\right)$$

where $r_n$ is the received set of pilot signals, $P_n^*$ is the conjugate of the phase symbol, and $\hat{H}_n e^{j\phi_n}$ is an estimate of the channel impulse response multiplied by the phase element taken from the trial phase vector.

\* \* \* \* \*